US011223586B1

(12) United States Patent
Rosenberg et al.

(10) Patent No.: US 11,223,586 B1
(45) Date of Patent: Jan. 11, 2022

(54) TECHNIQUES FOR A MESSAGING AGENT PLATFORM

(71) Applicant: Facebook, Inc., Menlo Park, CA (US)

(72) Inventors: Seth Garrett Steinberg Rosenberg, San Francisco, CA (US); Aditya Gopal Bhandarkar, San Jose, CA (US); Yoram Talmor, Cupertino, CA (US); Jeremy Harrison Goldberg, San Francisco, CA (US); Mikhail Larionov, Palo Alto, CA (US); Jessica Lee, Menlo Park, CA (US); Nicolas Andrij Bushak, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 16/747,955

(22) Filed: Jan. 21, 2020

Related U.S. Application Data

(63) Continuation of application No. 15/394,101, filed on Dec. 29, 2016, now Pat. No. 10,581,771.
(Continued)

(51) Int. Cl.
*H04L 12/58* (2006.01)
*G06Q 30/02* (2012.01)
(Continued)

(52) U.S. Cl.
CPC .......... *H04L 51/046* (2013.01); *G06F 3/0482* (2013.01); *G06Q 20/322* (2013.01);
(Continued)

(58) Field of Classification Search
CPC ....... H04L 51/046; H04L 51/16; H04L 51/32; H04L 51/04; H04L 67/02; H04L 67/04;
(Continued)

(56) References Cited

U.S. PATENT DOCUMENTS 6,973,481 B2    12/2005   MacIntosh et al.
7,899,706 B1 *   3/2011   Stone ................. G06Q 30/0256
                                                      705/14.55
(Continued)

FOREIGN PATENT DOCUMENTS

CN    102083053 A    6/2011
CN    102088690 A    6/2011
(Continued)

*Primary Examiner* — Blake J Rubin
(74) *Attorney, Agent, or Firm* — Kacvinsky Daisak Bluni PLLC

(57) ABSTRACT

Techniques for a messaging agent platform are described. In one embodiment, an apparatus may comprise a intermediary server operative to send a page-scoped identifier to a front-end application, the front-end application associated with an entity, the page-scoped identifier identifying a user account with a messaging system in relation to a representation for the entity within the messaging system; receive a user information request from a contact application at the intermediary server, the contact application associated with the representation for the entity within the messaging system, the user information request for the page-scoped identifier; determine a user access consent setting for the page-scoped identifier for the user account; and send a user information data package to the contact application in response to the user information request when the user access consent setting for the page-scoped identifier indicates user consent. Other embodiments are described and claimed.

17 Claims, 22 Drawing Sheets

Related U.S. Application Data

(60) Provisional application No. 62/321,082, filed on Apr. 11, 2016.

(51) Int. Cl.
| | |
|---|---|
| *G06F 3/0482* | (2013.01) |
| *H04W 4/12* | (2009.01) |
| *G06Q 50/00* | (2012.01) |
| *G06Q 30/06* | (2012.01) |
| *G06Q 20/32* | (2012.01) |
| *H04L 29/08* | (2006.01) |
| *H04L 29/06* | (2006.01) |
| *H04N 21/4788* | (2011.01) |

(52) U.S. Cl.
CPC ..... *G06Q 30/0203* (2013.01); *G06Q 30/0613* (2013.01); *G06Q 30/0631* (2013.01); *G06Q 30/0643* (2013.01); *G06Q 50/01* (2013.01); *H04L 51/16* (2013.01); *H04L 51/32* (2013.01); *H04L 67/02* (2013.01); *H04L 67/04* (2013.01); *H04L 67/18* (2013.01); *H04L 67/20* (2013.01); *H04L 67/2804* (2013.01); *H04L 67/306* (2013.01); *H04L 67/42* (2013.01); *H04W 4/12* (2013.01); *H04L 51/04* (2013.01); *H04N 21/4788* (2013.01)

(58) Field of Classification Search
CPC ..... H04L 67/18; H04L 67/20; H04L 67/2804; H04L 67/306; H04L 67/42; G06F 3/0482; G06Q 20/322; G06Q 30/0203; G06Q 30/0613; G06Q 30/0631; G06Q 30/0643; G06Q 50/01; H04W 4/12; H04N 21/4788
See application file for complete search history.

(56) References Cited

U.S. PATENT DOCUMENTS

| | | | | |
|---|---|---|---|---|
| 9,237,121 B1* | 1/2016 | Graham | ............. | H04L 51/12 |
| 9,256,761 B1* | 2/2016 | Sahu | ............. | G06F 16/90335 |
| 9,691,090 B1* | 6/2017 | Barday | ............. | G06Q 10/0635 |
| 9,858,562 B2 | 1/2018 | Yeates et al. | | |
| 9,953,342 B1* | 4/2018 | Gourley | ............. | G06Q 30/0201 |
| 2003/0191689 A1* | 10/2003 | Bosarge | ............. | G06Q 30/0271 |
| | | | | 705/14.35 |
| 2008/0010125 A1* | 1/2008 | Wright | ............. | G06Q 30/0268 |
| | | | | 705/14.66 |
| 2008/0077478 A1* | 3/2008 | Kim | ............. | G06Q 30/0224 |
| | | | | 705/7.32 |
| 2008/0228572 A1* | 9/2008 | Teterin | ............. | G06Q 30/02 |
| | | | | 705/14.64 |
| 2008/0306807 A1* | 12/2008 | Amento | ............. | G06Q 30/0631 |
| | | | | 705/7.33 |
| 2009/0249244 A1* | 10/2009 | Robinson | ............. | G06F 3/04842 |
| | | | | 715/781 |
| 2010/0082376 A1* | 4/2010 | Levitt | ............. | G06Q 10/109 |
| | | | | 705/7.18 |
| 2010/0082409 A1* | 4/2010 | Badyrka | ............. | G06Q 30/02 |
| | | | | 705/14.4 |
| 2010/0161382 A1* | 6/2010 | Cole | ............. | G06Q 30/02 |
| | | | | 705/7.32 |
| 2011/0093335 A1* | 4/2011 | Fordyce, III | ............. | G06Q 20/40 |
| | | | | 705/14.53 |
| 2011/0106618 A1* | 5/2011 | Ben-Moshe | ............. | G06Q 99/00 |
| | | | | 705/14.49 |
| 2012/0109882 A1* | 5/2012 | Bouse | ............. | H04L 67/306 |
| | | | | 707/607 |
| 2012/0158787 A1 | 6/2012 | Hu et al. | | |
| 2012/0278173 A1* | 11/2012 | Vaidyanathan | ............. | G06Q 30/02 |
| | | | | 705/14.58 |
| 2013/0018954 A1* | 1/2013 | Cheng | ............. | G06F 16/436 |
| | | | | 709/204 |
| 2013/0018957 A1* | 1/2013 | Parnaby | ............. | G06Q 50/01 |
| | | | | 709/204 |
| 2013/0073336 A1* | 3/2013 | Heath | ............. | G06Q 30/02 |
| | | | | 705/7.29 |
| 2013/0212638 A1* | 8/2013 | Wilson | ............. | G06Q 50/26 |
| | | | | 726/1 |
| 2013/0246225 A1* | 9/2013 | Biltz | ............. | G06Q 50/01 |
| | | | | 705/27.1 |
| 2013/0290435 A1 | 10/2013 | Martin et al. | | |
| 2014/0032672 A1* | 1/2014 | Yoshikawa | ............. | H04W 4/21 |
| | | | | 709/204 |
| 2014/0172545 A1* | 6/2014 | Rabkin | ............. | G06Q 30/0269 |
| | | | | 705/14.44 |
| 2014/0373182 A1* | 12/2014 | Peri | ............. | G06F 21/6245 |
| | | | | 726/30 |
| 2015/0046259 A1* | 2/2015 | Hicken | ............. | G06Q 30/0256 |
| | | | | 705/14.54 |
| 2015/0332313 A1* | 11/2015 | Slotwiner | ............. | G06Q 30/0241 |
| | | | | 705/14.44 |
| 2015/0373144 A1* | 12/2015 | Cohen | ............. | H04L 51/04 |
| | | | | 709/206 |
| 2016/0063547 A1* | 3/2016 | Ghosh | ............. | G06Q 30/0255 |
| | | | | 705/14.53 |
| 2016/0112208 A1* | 4/2016 | Williams | ............. | H04L 9/3247 |
| | | | | 713/158 |
| 2016/0225000 A1* | 8/2016 | Glasgow | ............. | G06Q 30/0207 |
| 2016/0301764 A1* | 10/2016 | Ruback | ............. | G06F 3/04847 |
| 2017/0118500 A1* | 4/2017 | Carroll | ............. | H04N 21/26258 |
| 2017/0201850 A1 | 7/2017 | Raleigh et al. | | |
| 2018/0324064 A1* | 11/2018 | Tola | ............. | H04L 43/04 |
| 2019/0392019 A1* | 12/2019 | Brannon | ............. | G06F 16/972 |

FOREIGN PATENT DOCUMENTS

| | | |
|---|---|---|
| JP | 2007058610 A | 3/2007 |
| WO | 2013031096 A1 | 3/2013 |

* cited by examiner

600

---

Send a page-scoped identifier to a commerce front-end application from a commerce intermediary server, the commerce front-end application associated with a commerce entity, the page-scoped identifier identifying a user account with a messaging system in relation to a commerce representation for the commerce entity within the messaging system.
602

---

Receive a user information request from a commerce contact application at the commerce intermediary server, the commerce contact application associated with the commerce representation for the commerce entity within the messaging system, the user information request for the page-scoped identifier.
604

---

Determine a user access consent setting for the page-scoped identifier for the user account.
606

---

Send a user information data package to the commerce contact application from the commerce intermediary server in response to the user information request when the user access consent setting for the page-scoped identifier indicates user consent.
608

---

Reject the user information request when the user access consent setting for the page-scoped identifier indicates user non-consent.
610

Receive a commerce message package at a commerce intermediary server from a commerce messaging application, the commerce messaging application associated with a commerce entity, the commerce message package addressed to a message thread with a messaging system.
622

Determine commerce access privileges for the commerce messaging application in association with the message thread.
624

Send the commerce message package to a client device associated with the message thread when the commerce access privileges indicate access to the message thread.
626

Reject the commerce message package when the commerce access privileges reject access to the message thread.
628

Receive a user interface selection of a user-to-commerce message thread on a client device, the user-to-commerce message thread associated with a commerce entity with a messaging system.
662

Display a user-to-commerce message thread interface for the user-to-commerce message thread.
664

Receive a user-to-commerce message via the user-to-commerce message thread interface for the user-to-commerce message thread.
666

Send the user-to-commerce message to the commerce entity via the messaging system.
668

```
┌─────────────────────────────────────────────┐
│ Receive a commerce interface control selection in a user-to- │
│ user message thread interface on a client device, the user-to- │
│ user message thread associated with a user-to-user message │
│ thread for a plurality of users with a messaging system. │
│ 662 │
└─────────────────────────────────────────────┘
                        │
┌─────────────────────────────────────────────┐
│ Display a commerce interface in association with the user-to- │
│ user message thread interface, the commerce interface │
│ comprising a plurality of commerce configuration options. │
│ 664 │
└─────────────────────────────────────────────┘
                        │
┌─────────────────────────────────────────────┐
│ Receive a commerce option share control selection in │
│ association with the commerce interface. │
│ 666 │
└─────────────────────────────────────────────┘
                        │
┌─────────────────────────────────────────────┐
│ Share the plurality of commerce configuration options with │
│ the user-to-user message thread. │
│ 668 │
└─────────────────────────────────────────────┘
```

*FIG. 6D*

TECHNIQUES FOR A MESSAGING AGENT PLATFORM

RELATED APPLICATIONS

This application claims the benefit of priority under 35 U.S.C. § 119(e) to U.S. patent application Ser. No. 15/394,101, titled "Techniques for A Messaging Agent Platform," filed on Dec. 29, 2016, which claims the benefit of priority under 35 U.S.C. § 119(e) to U.S. Provisional Patent Application No. 62/321,082, titled "Techniques for Messaging Agent Interactions," filed on Apr. 11, 2016, which is hereby incorporated by reference in its entirety.

This application is related to the U.S. patent application titled "Techniques for Messaging Agent Customization," Ser. No. 15/394,107, filed on Dec. 29, 2016, which is hereby incorporated by reference in its entirety.

This application is related to the U.S. patent application titled "Techniques for Messaging Agent Messaging Interactions," Ser. No. 15/394,116, filed on Dec. 29, 2016, which is hereby incorporated by reference in its entirety.

This application is related to the U.S. patent application titled "Techniques for Messaging Agent Coordination," Ser. No. 15/394,126, filed on Dec. 29, 2016, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for messaging agent interactions. Some embodiments are particularly directed to techniques for messaging agent interactions for commerce interactions within a messaging client. In one embodiment, for example, an apparatus may comprise a commerce intermediary server device. In another embodiment, for example, an apparatus may comprise a client device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6A illustrates an embodiment of a first logic flow for the system of FIG. 1.

FIG. 6B illustrates an embodiment of a second logic flow for the system of FIG. 1.

FIG. 6C illustrates an embodiment of a third logic flow for the system of FIG. 1.

FIG. 6D illustrates an embodiment of a fourth logic flow for the system of FIG. 1.

DETAILED DESCRIPTION

Figure 1:
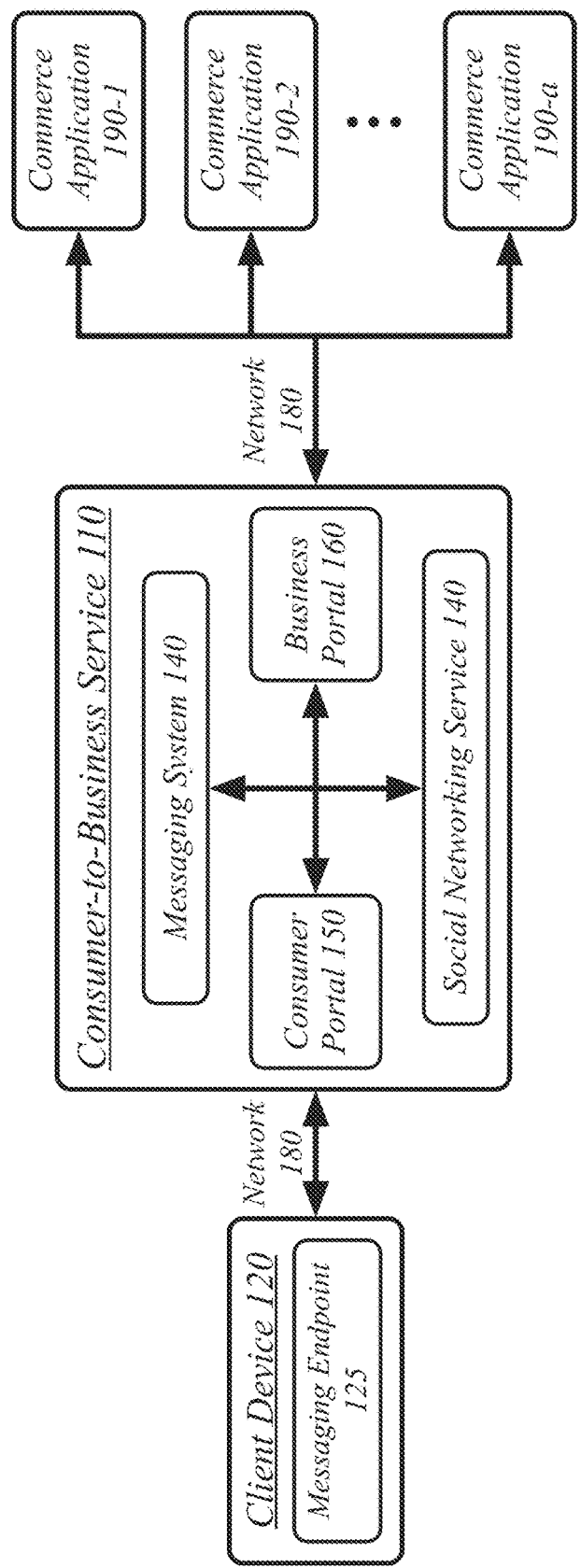
FIG. 1 illustrates an embodiment of a consumer-to-business messaging system.

Users may engage with a business via a page in a social-networking service using messaging communication, as they may be familiar with from chatting with friends. Users may discover, engage with, and purchase products and services from these businesses in the same messaging application they use for communicating with friends, colleagues, and other acquaintances. Some of these messages may be automatically responded to, while others may be responded to fully or partially manually by administrators of business pages.

Users may be accustomed to interacting with a business via a web page. Even where this web page contains interactive or dynamic elements, the interaction is still received in the presentation style of a web page. Business pages, similar to web pages, may be accessible via a messaging system. However, where a web page may empower chatting via a pop-up dialog box, a messaging system may display a conversational interaction with a business to a messaging-specific interface. This may serve to ground the interaction in the presentation style of messaging, thereby humanizing and personalizing the experience. Further, just as with messaging with another person, the messaging client may maintain a history of a conversation, allow navigation away from the conversation and returning, and a mirroring of the conversation across multiple user devices. In contrast, a pop-up messaging dialog on a web page is temporary, stuck to a browser window that cannot be closed until the conversation is completed, and rooted in a single user device. This conversation with a business page may be represented by a messaging bot, the messaging bot a virtual representation of the business page in a messaging environment. The messaging bot may function as an avatar for the business and unify the experience of messaging with a business within a single messaging representation.

A messaging client may execute in a variety of environments. A first implementation may execute on the iOS™ platform, a second implementation on the Android™ platform, and a third may be embedded within a web page for a messaging service and/or social-networking service, without limitation. The same messaging bot may be accessed through a messaging client on any of these platforms, connected to the messaging clients on each of the platforms through a unified messaging system. As such, the development of a messaging bot may be simplified, with the messaging system adapting the messaging experience to each platform. And the user's experience may be unified, such that they experience the same messaging bot whichever device they use to access the messaging system. And because the messaging system may replicate messaging state between devices, they may begin a conversation on one device and then continue it on another. For instance, a user may initiate a conversation about a product from a smartphone device when viewing a product in a physical store, then pick up the conversation from home on their personal computer or tablet device.

By extending their presence to an existing messaging system and messaging client, a business may gain a new and rich channel for connecting with their customers. Messaging can provide the interactivity of a phone conversation, but with an asynchronous engagement and thereby accommodation of a user's personal schedule. A messaging system can provide reliable delivery, delivery receipts for both the business and user, rich interfaces, complex media communication, and duplication across multiple devices. And this functionality can be discovered by the users of the messaging system without them having to install a custom application for the business. For example, an airline can empower checking in, receiving a boarding pass, getting notified of flight delays, and making changes all through an existing infrastructure without having to deploy a custom application or convince users to install the application.

In particular, many of the situations that might prompt a user to want to access a business through a mobile device—for example, an emergency need to reschedule a flight while on a trip—may be precisely those situations in which it would be inconvenient to discover a business-specific application, download it, configure it, connect it to their account, and then carry out their desired task. Instead, a user may access the business through an application they already have on their device and use for personal communication and communication with other businesses. Further, the messaging system may be able to verify the identity of a user to the business, such as by having already verified a user's phone number and being able to attest that the phone number is associated with the user using the messaging client.

Businesses may be empowered, therefore, to reach out to customers using this additional channel. Existing customers may be matched based on their identifying information, such as their name, address, or phone number. The business may be empowered to send an introductory message to identified existing customers to invite them to use the messaging system as a communication channel with the business. However, the messaging system may protect the privacy of the customers by only providing access to any account information if the user themselves engages with the business through actively messaging with the business, such as in response to an introductory message from the business. Users may therefore feel safe that the presence of businesses on the messaging system they use will only open them to contact on this new channel if they desire it. The acquisition of new customers may be promoted by encouraging the discovery of businesses within a messaging client, though the actual messaging of new customers may be prevented until the user themselves reaches out to the business.

Similarly, the privacy of users may be protected by limiting the scope of how sponsored messages may be sent by businesses to users. Rather than allowing the broad spamming of advertisements via a messaging channel, businesses may be empowered to use sponsored messages to attempt to reengage users that have already expressed their interest in engaging with a business via a messaging system. An Internet retailer attempting to broadly message users details about their products may drive users away from a messaging system, and, as such, the messaging system may employ techniques to avoid indiscriminate or impersonal promotion and instead guide businesses to use highly-discriminating and personally-targeted promotion. The messaging system may analyze both the targets of sponsored messages and the contents of sponsored messages in an attempt to reduce indiscriminate promotion.

The messaging system may restrict businesses to only sending sponsored messages to users or threads (e.g., threads between users) that have previously engaged in messaging with that business. This may encourage businesses to take on the task of encouraging users to engage with them—to make their messaging channel a valuable tool for interaction—before they are granted the privilege of pushing promotional information to the user. The messaging system may restrict the contents of sponsored messages to being responsive to the specific interactions between a business and its customers. If a user had asked about a product, but it was out of stock, it may be appropriate for a business to inquire whether the user was still interested in it, even if the user didn't specifically ask to be notified: this is personal, and still may be prevented by a user by blocking the business in the messaging client. Similarly, if a user-to-user thread asked a restaurant reservation messaging bot about the availability of a restaurant, it may be appropriate for a business to notify the thread that they'll need to make a reservation soon if they want one, as the restaurant is filling up. However, a business may be prevented from broadly spamming users every evening about whether they are interested in making a reservation, even if they would compensate the messaging system for the privilege of doing so.

Spam protection may be provided on both an individual and community-wide level. A business may be prevented from contacting individual users without at least the implied consent of those users, such as may be received by the user messaging with the business or specifically requesting that the business contact them through the messaging system. The user may be empowered to withdraw this consent, such as through the display of a prominent block button in each message thread with a business that completely prevents the business from messaging them again. This feedback may then be captured to protect the community as a whole. A business with a large amount of negative user feedback, such as through being blocked, may be rate limited or removed from the messaging system completely. This may be manually or automatically applied in various embodiments.

In some embodiments, a user may be provided with multiple block buttons. A full-block button may completely block all messages from the business to the user, completely shutting the business out from contacting the user. A sponsored-message block button may only prevent the sending of sponsored messages—messages outside the active communication between a user and a business in response to a user request that a business may pay the messaging system to be able to send. A business may therefore be temporarily authorized to message a user in response to a user request. For instance, the business may be provided a limited-time access token that allows them to, for free, send messages to the user for a limited period of time in response to the user messaging the business. However, the business may be prevented from sending messages, including sponsored messages, outside the limited period of time. The use of the full-block button by a sufficient number of users may prompt a review of the business's interactions with users in general, while the user of the sponsored-message block button by a sufficient number of users may prompt a review of the business's use of sponsored messages.

Further, businesses may be required to submit an application that outlines their intended integration with the messaging system prior to being authorized to use the messaging system. Businesses that violate their agreed-to use without re-submission, re-review, and re-approval may also be removed, at least until such time that a new application is approved. Messages sent by messaging bots may be randomly selected and presented to operators in comparison with their approved integration application, and penalized when the messages fail to meet the outline they were approved for. In particular, the message system may enforce a prevention of using message threads for advertising, with bots that routinely or repeatedly engage in advertising being removed from the system. Businesses may be initially warned that messages are too similar to advertisements, so as to encourage correction of behavior, with repeated offenses resulting in removal.

Businesses may also be monitored for the sending of large numbers of identical or highly-similar messages within a short period of time. Comparisons may be made between the messages sent by a business and the business may be rate-limited or removed for doing so except where approved for doing so as part of their proposal for using the messaging system. For example, a messaging bot for the providing of location-specific weather reports, or for the sending of emergency weather alerts or other emergency alerts (e.g., missing children), may be approved to send highly-similar mass messages to users requesting this service as the users are explicitly requesting to be informed of broadly-applicable information. However, businesses may need to be explicitly approved for such sending patterns and businesses without this approval may be automatically rate-limited temporarily shut out if they engage in mass messaging of identical or highly-similar messages, until such time a human review may be performed. Businesses with explicit approval may be flagged in the messaging system as having such so as to avoid automatic or manual restriction.

Businesses may be provided with access to a messaging system using messaging-style semantics, in which the interaction is constructed out of atomic interchanges of information with a strict order applied by the messaging system. After a registration of a messaging bot, which may be performed using non-messaging semantics, the performance of the messaging bot itself by a business may be built on messaging interactions. Businesses of any type may receive access to a generic application program interface (API) with generic templates empowering the sending of various types of messages. These generic message templates may include text, images, and call-to-action (CTA) controls to power their specific functions. A CTA may be displayed as a visual control, such as a button, and may result in access to uniform resource location (URL) addresses, to posting messages back to the business, or triggering other automated responses. As such, a business may build their experience out of generally-available tools, sending messages that include text, rich media, and even controls that the user can act on. As a CTA can send back a message or access a URL, any action that a business can trigger through a URL access or off a message, including purchases, cancellations, requests for status updates, or anything else, can be empowered for a user by a message from a business. However, businesses may also be empowered to construct custom templates where needed and approved as part of an approval process by the messaging platform.

Businesses may be empowered to customize a user's experience with the business via the messaging system. When first accessing a message thread with a messaging bot, the message thread may be customized by the business in its null or empty state. The context banner that may be displayed at the top of a messaging client may be customized, such as with the logo of the business. The background of the thread display may have introductory text customized by the business. A "get started" button may be displayed, which may, for example, send a message to the business informing them that a new user is requesting to begin a conversation with the business. This may authorize the business with the messaging system to begin messaging with the user, which they may take advantage of by sending additional introductory information. Further, this may empower the business to retrieve identifying information for the user—such as a phone number registered with the user's profile—that they may match against their own repository of customer information, thereby empowering the business to engage in a conversation with the user that incorporates the status that customer has already achieved with the business.

For instance, a user may open a message thread with a business and hit a "get started" button, which sends a message to the business notifying the business that the user wishes to engage with it via a messaging channel. The business may be provided with an identifier for the user, with the business empowered to use the identifier to retrieve at least a portion of the profile information for the user. The business may retrieve a phone number for the user and match this phone number against its own database of user information. If the user is an existing customer, the business may then be able to respond to the "get started" button with a personalized introduction for the user. For example, a user messaging a hotel chain or airline may be greeted with a reference to a reward level that they've achieved, letting the user known that the same customized service they've typically received over the phone or in person will be provided via the messaging system.

Businesses may be empowered to guide users to interactions via the messaging system from their web pages. A messaging-contact button may be provided by the messaging system via a web plugin that a business can place on their web page. When pressed, an identifier for a user may be sent to the business that may be used by the business to address messages to the user via the messaging system. The messaging-contact button may empower a business to start a business-first messaging conversation with the user, where the first message in the conversation is sent by the business. The use of this type of button may keep a user within the interface for the business's webpage, with the empowering of a business to message the user occurring behind the scenes without interrupting the user's experience.

An alternative or additional web plugin may be provided by the messaging system to businesses that may be placed on the businesses web page. This web plugin my instantiate a message-initiation button that, when pressed, takes the activating user to a messaging client and directly to a message thread with the business, which may be an existing message thread or may be a new message thread created in response to the user activating the button. When accessed from a personal computer, this messaging client may be a web-based messaging client. When accessed from a smartphone or tablet device, the messaging client may be a dedicated messaging-specific client for the messaging system. The use of this type of button may transition the user's experience from the business's web page to a messaging interface.

Either type of button may be customized according to the current web viewing experience of the year. For instance, the web plugin may empower the passing of a parameter specifying the specific URL on which the button was pressed. This may be used to customize the initial experience in a message thread, such as by opening a discussion in relation to a specific product or service represented on the web page. A user may be protected from accidentally using one of these buttons by having a confirmation dialog box temporarily placed over the web page confirming the user account with the messaging system that will be linked and empowering either approval or cancelation of the linking. A not-me button may be included so that if the wrong account is presented, the user may log out an existing account and log in as themselves. If no account is currently logged in with the messaging system, a login dialog box may be presented. Web plugins may be implemented using the Javascript™ scripting language.

As such, businesses that engage in personal messaging experiences with consenting users may be empowered to expand the scope and desirability of their business to their customers. The messaging system may increase its utility for its users and therefore its engagement with its users, increasing its scope of use.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-$a$ may include components 122-1, 122-2, 122-3, 122-4 and 122-5. The embodiments are not limited in this context.

FIG. 1 illustrates a block diagram for a consumer-to-business messaging system 100. In one embodiment, the consumer-to-business messaging system 100 may comprise a computer-implemented system having software applications comprising one or more components. Although the consumer-to-business messaging system 100 shown in FIG. 1 has a limited number of elements in a certain topology, it may be appreciated that the consumer-to-business messaging system 100 may include more or less elements in alternate topologies as desired for a given implementation.

A consumer-to-business service 110 may serve as an intermediary between consumers and businesses. Consumers and businesses may both be users of the consumer-to-business service 110, with consumers represented via an individual user account and businesses represented by a commerce account and, possibly, one or more individual user accounts associated with the business, such as individual user account associated with representatives and other employees of the business. A consumer user may be represented with a user entity entry in a social graph. A business or other commercial user may be represented by a commerce entity in a social graph. The relationship between the consumer user and the commercial user may be represented by one or more edges between the user entity and commerce entity in the social graph.

The consumer-to-business service 110 may comprise a messaging system 140. The messaging system 140 may be generally arranged to receive, store, and deliver between individual entities such as individual users and collective entities such as businesses and other organizations. The messaging system 140 may store messages while messaging endpoints, such as messaging endpoint 125, are offline and deliver the messages once the messaging endpoints are available. The messaging system 140 may empower a user to use multiple messaging endpoints (e.g., a messaging client on a mobile device, a web browser on a personal computer) for the same user account, with the messaging system 140 keeping all of the messaging endpoints up-to-date as to the messaging state of the user account.

The consumer-to-business service 110 may comprise a social networking service 170. The social networking service 170 may maintain a social graph data structure representing a social graph. The social graph may represent relationships between entities, such as user entities, commerce entities, and any other sort of entity. The social graph may represent the relationships as graph relationships, in which all information is encoded as either being attached to a particular node in the graph or attached to a particular edge between two nodes in the graph. The social networking service 170 may be an element of a social-networking service, with the social graph containing, at least in part, social-networking information. The whole of the consumer-to-business service 110 may be an element or composed of elements of a social-networking service.

The consumer-to-business service 110 may comprise a consumer portal 150. The consumer portal 150 may be a unified entry point into the consumer-to-business service 110 for client applications being used by consumers. The consumer portal 150 may serve as a general user portal for non-commerce entities, including users that are not or do not engage in commerce using the consumer-to-business service 110. The consumer portal 150 may provide access to the messaging system 140 and the social networking service 170. In some embodiments, all access to the social networking service 170 may be mediated by the consumer portal 150 in which the information of the social networking service 170 is used and managed on behalf of the user without the user having direct access to some or all of the social graph information. In some embodiments, the user may have direct access to the messaging system 140 using their user account, with the consumer portal 150 limited to consumer functions of the consumer-to-business service 110 with general messaging functionality (e.g., messaging with friends) provided through direct network communication between the messaging endpoint 125 and the messaging system 140 without the mediation of the consumer portal 150.

The consumer-to-business service 110 may comprise a business portal 160. The business portal 160 may be a unified entry point into the consumer-to-business service 110 for client application being used by business entities. The business portal 160 may provide access to the messaging system 140 and the social networking service 170. In some embodiments, all access to the social networking service 170 may be mediated by the business portal 160 in which the information of the social networking service 170 is used and managed on behalf of the commerce entity without the commerce entity having direct access to some or all of the social graph information. In some embodiments, the commerce entity may have direct access to the messaging system 140 using their commerce account, with the business portal 160 limited to business functions of the consumer-to-business service 110 with general messaging functionality (e.g., messaging with customers) provided through direct network communication between one or more commerce applications 190 and the messaging system 140 without the mediation of the business portal 160.

A user may participate in the consumer-to-business messaging system 100 and interact with the consumer-to-business service 110 using a messaging endpoint 125 software application executing on a client device 120. The client device 120 may typically be a smartphone—a mobile phone capable of executing software applications that provide functionality beyond that of a conventional telephone—such as an iPhone®, Android® phone, or other smartphone. The messaging endpoint 125 may be specifically associated with a particular messaging system 140 that forms part of the consumer-to-business service 110 or may be a general-purpose messaging client operative to interact with a plurality of messaging services. The messaging endpoint 125 may interact with one or both of the consumer portal 150 and the messaging system 140 for the performance of messaging tasks and commerce tasks.

A commerce entity, such as through the actions of representatives, employees, and/or agents of the commerce entity, may participate in the consumer-to-business messaging system 100 and interact with the consumer-to-business service 110 using commerce applications 190. Commerce applications 190 may comprise software clients used by commerce entities for participating in the consumer-to-business messaging system 100. The commerce applications 190 may interact with one or both of the business portal 160 and the messaging system 140 for the performance of messaging tasks and commerce tasks. The commerce applications 190 may comprise applications used by individuals within a commerce entity for administration of a business's presence within the consumer-to-business messaging system 100, for carrying out purchased services or providing purchased products, or for carrying out any other tasks related to the consumer-to-business messaging system 100.

A commerce entity may be represented in a messaging system by a commerce representation comprising a collection of information for display to a user. A commerce representation may comprise a business page, the business page being the identity of a business within the consumer-to-business messaging system 100. The business page may display information regarding a commerce entity. The business page may include information for the commerce entity, such as one or more of a physical location for the commerce entity, the operating hours of the physical location, or the hours in which the commerce entity (e.g., a representative of the commerce entity) is available for messaging through the consumer-to-business messaging system 100. The business page may include social-networking information for the commerce entity, such as a list of friends of a viewing user that have "liked" or "followed" the commerce entity within a social network as may be represented in a social graph.

A commerce representation may not correspond precisely to a commerce entity. A single commerce entity, such as a business, may have multiple commerce representations and therefore multiple business pages. For example, a single business may have different representations for different brands owned and operated by the same business. A retailer or reseller may sell multiple brands and may have different representations for different brands that they sell. A business may have different representations for different geographic areas in which they operate, such as one business page for the United States, another for Europe, another for Russia, etc.

An agent for a commerce representation may be presented in messaging conversation in a messaging system 140. A user of the messaging system 140 may interact with the agent via messaging with the agent comprising a virtual representation of a business, with the agent corresponding to a commerce representation presented as a business page. Messaging with the agent may therefore extend the presence of a commerce representation as a business page, primarily dedicated to providing information from the business to users, to interactive messaging in which users and the business can engage in a conversation.

Users, consumers, may use a messaging client for the messaging system 140 to interact with the agent. An application may correspond to a specific registration empowering access to the messaging system 140 and/or social networking service 170 via an application programming interface (API). An application may be registered with the messaging system 140 via various registered hooks for the application specifying how the application can be contacted by the messaging system 140. These hooks may be used to contact the application in response to events, such as user messaging, within the messaging system 140. An application may be assigned a secure token that may be used for authentication and the secure reception and sending of information with the messaging system 140. An application may correspond to a specific AppID with the messaging system 140 and/or social networking service 170. Because the business may surface multiple aspects of the services and products it provides via the agent, multiple different applications may be used by a commerce entity to interact with a user via the messaging system 140. Each application may be subscribed with the messaging system 140 to the one or more commerce representations, such as business pages, that it powers.

Different commerce applications of a plurality of commerce applications 190 may implement different functions for a commerce entity. For example, a first commerce application may be used by customer support representatives while a second commerce application is used by order fulfillment representatives. The former may respond to and be notified of user inquiries relating to a performed order, such as problems or complaints. The latter may respond to and be notified of user requests for products of services. In another example, a first commerce application may be used by live customer support representatives while a second commerce application is used by an automated customer support system. Other types of commerce applications may be used without limitation. As such, a given commerce representation, corresponding to a business page, may be powered by multiple commerce applications.

Similarly, a given commerce application may be power multiple commerce representations and therefore interactions with multiple business pages. For instance, a business with multiple brands, each represented by a different business pages, and therefore different commerce representations, may power multiple brands with the same application or applications. Similarly where a business has different business pages for different geographic regions. In another example, a commerce application for a delivery company may, in association with deliveries for various clients, power those clients commerce representations via the messaging system 140 for updates regarding the deliveries. The embodiments are not limited to these examples.

The network 180 may comprise any form of computer network operative to carry computer transmissions between computer devices. The network 180 may include one or both of intranets and the Internet. The network 180 may include cellular data and/or Wi-Fi data networks, such as may be used to provide connectivity to a mobile client device 120.

The consumer-to-business messaging system 100 may use knowledge generated from interactions between users. The consumer-to-business messaging system 100 may comprise a component of a social-networking service and may use knowledge generated from the broader interactions of the social-networking service. As such, to protect the privacy of the users of the consumer-to-business messaging system 100 and the larger social-networking service, consumer-to-business messaging system 100 may include an authorization server (or other suitable component(s)) that allows users to opt in to or opt out of having their actions logged by the consumer-to-business messaging system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the consumer-to-business messaging system 100 and other elements of a social-networking service through blocking, data hashing, anonymization, or other suitable techniques as appropriate. For example, while interactions between users of a social-networking service and the social-networking service may be used to learn media content preferences and the relationship between preferences for different pieces of media content, these interactions may be anonymized prior to or as part of the learning process.

Figure 2:
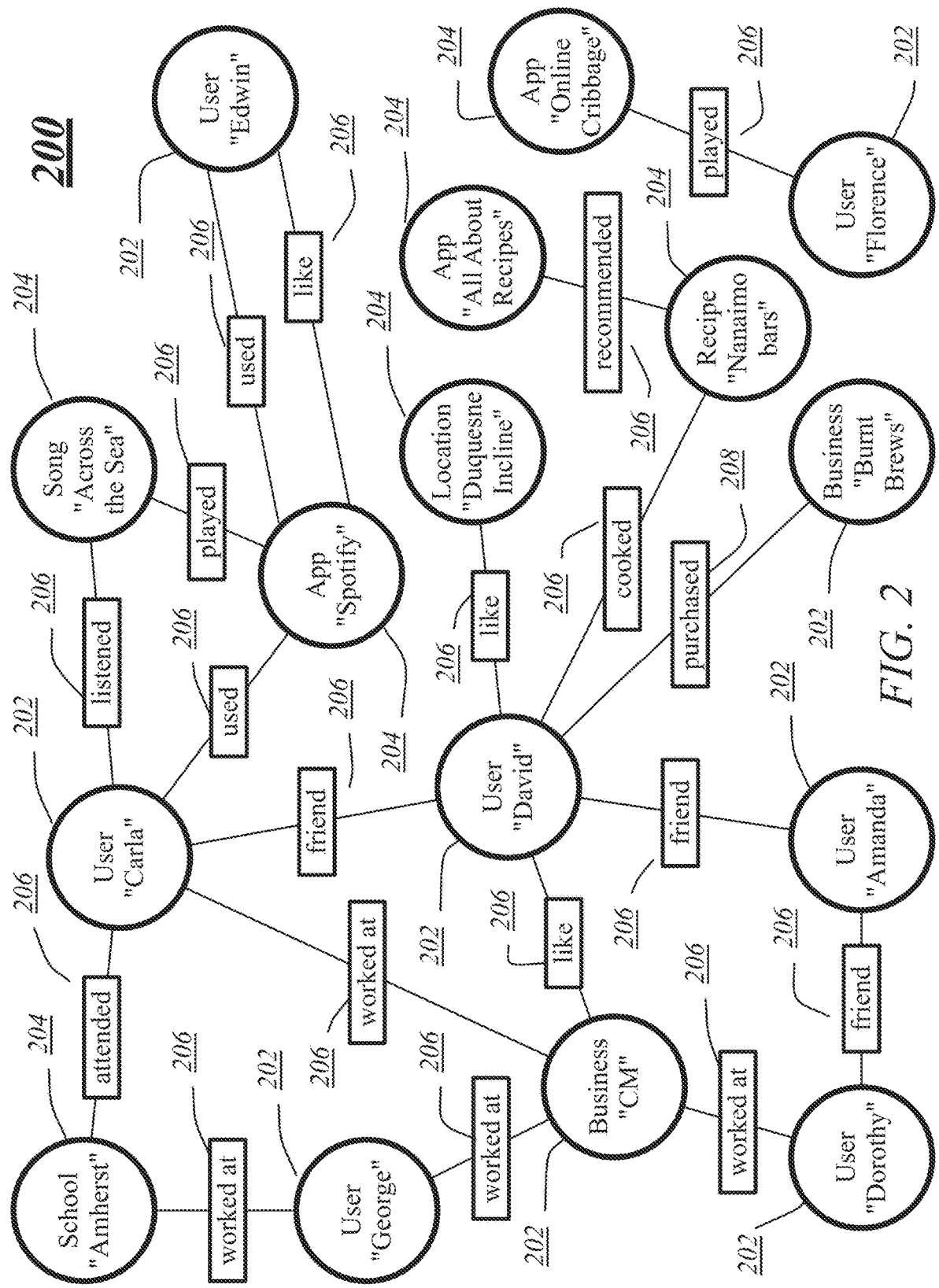
FIG. 2 illustrates an embodiment of a social graph.

FIG. 2 illustrates an example of a social graph 200. In particular embodiments, a social-networking system may store one or more social graphs 200 in one or more data stores as a social graph data structure.

In particular embodiments, social graph 200 may include multiple nodes, which may include multiple user nodes 202 and multiple concept nodes 204. Social graph 200 may include multiple edges 206 connecting the nodes. In particular embodiments, a social-networking system, client system, third-party system, or any other system or device may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of the social-networking system. As an example and not by way of limitation, a user may be an individual (human user), an entity (e.g., an enterprise, business, or third-party application), or a group (e.g., of individuals or entities) that interacts or communicates with or over the social-networking system. In particular embodiments, when a user registers for an account with the social-networking system, the social-networking system may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system. In particular embodiments, a user node 202 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. A user node 202 may be associated with a unique user identifier for the user in the social-networking system.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. A business page such as business page 205 may comprise a user-profile page for a commerce entity. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "Amanda" and user "Dorothy." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Across the Sea"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "Edwin" and concept node 204 for "SPOTIFY").

In particular embodiments, the social-networking system may create an edge 206 between a user node 202 and a concept node 204 in social graph 200. As an example and not by way of limitation, a user viewing a concept-profile page (such as, for example, by using a web browser or a specialpurpose application hosted by the user's client system) may indicate that he or she likes the concept represented by the concept node 204 by clicking or selecting a "Like" icon, which may cause the user's client system to send to the social-networking system a message indicating the user's liking of the concept associated with the concept-profile page. In response to the message, the social-networking system may create an edge 206 between user node 202 associated with the user and concept node 204, as illustrated by "like" edge 206 between the user and concept node 204. In particular embodiments, the social-networking system may store an edge 206 in one or more data stores. In particular embodiments, an edge 206 may be automatically formed by the social-networking system in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The social graph 200 may further comprise a plurality of product nodes. Product nodes may represent particular products that may be associated with a particular business. A business may provide a product catalog to the consumer-to-business service 110 and the consumer-to-business service 110 may therefore represent each of the products within the product in the social graph 200 with each product being in a distinct product node. A product node may comprise information relating to the product, such as pricing information, descriptive information, manufacturer information, availability information, and other relevant information. For example, each of the items on a menu for a restaurant may be represented within the social graph 200 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 200. The information for a product node may be manipulated by the social-networking system as a product object that encapsulates information regarding the referenced product.

Figure 3A:
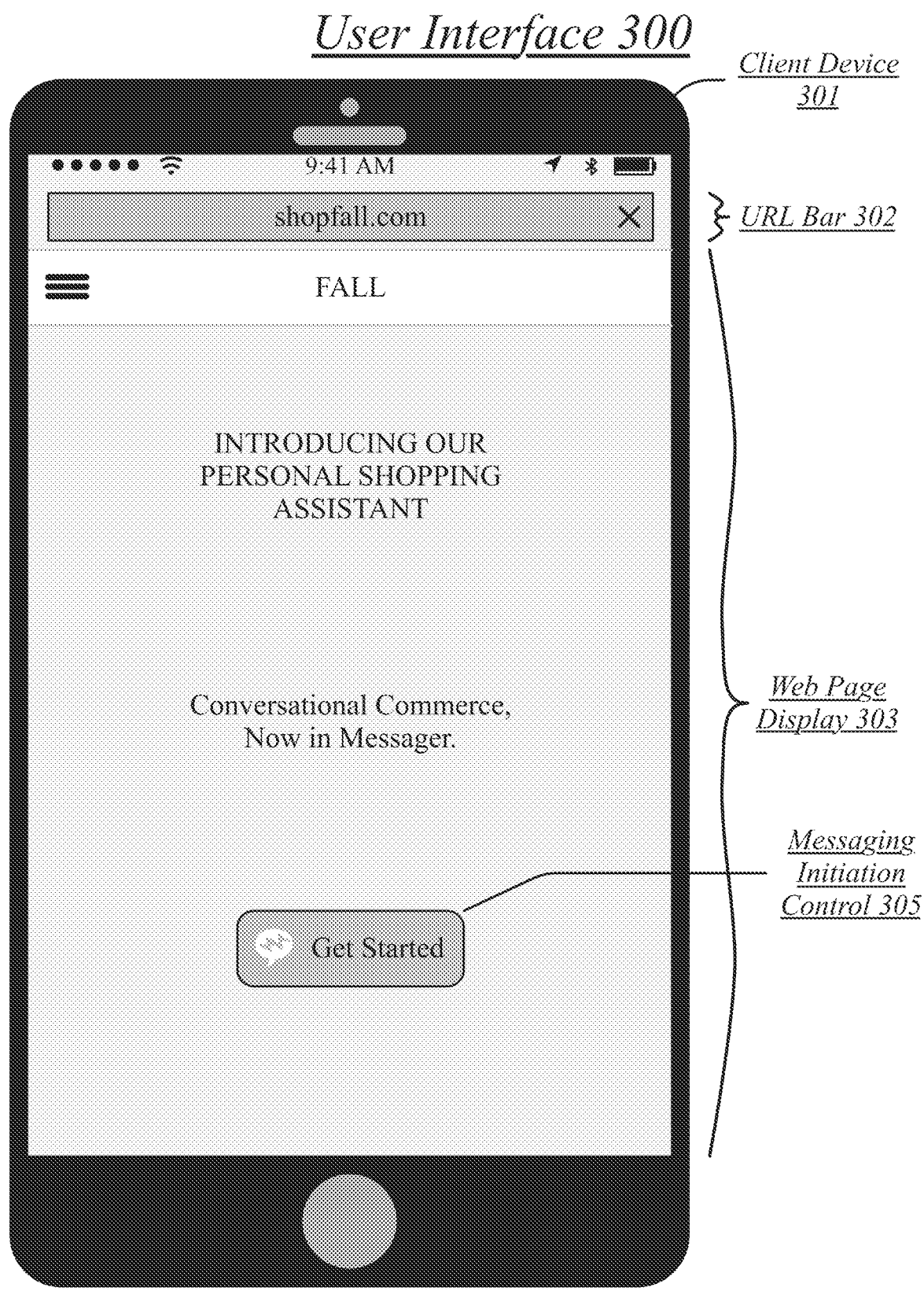
FIG. 3A illustrates an embodiment of a user interface for a business web page.

FIG. 3A illustrates an embodiment of a user interface 300 for a business web page.

A client device 301 may correspond to any device used to access a consumer-to-business messaging system 100. While in the illustrated embodiment of FIG. 3A the client device 301 resembles a smartphone device, it will be appreciated that the techniques described herein may be used with any type of device.

The user interface 300 may generally correspond to a web page display 303 for a partner of the consumer-to-business messaging system 100. The web page display 303 may be a display of a web page created and operated by the partner rather than being created and operated by the operator of the consumer-to-business messaging system 100. For instance, a business web page may be hosted by a business distinct from the consumer-to-business messaging system 100. The web page may be identified by a uniform resource locator (URL) which may be visually displayed or represented in a URL bar 302 displayed on the client device 301.

The web page may comprise a messaging initiation control 305. Selection of the messaging initiation control 305 by a user may redirect a client device to a messaging client and specifically to a message thread with a messaging bot for the business in the messaging client. The messaging initiation control 305 may be instantiated by a web plugin. A web plugin may be provided by the consumer-to-business messaging system 100 and installed by the business in the web page. Alternatively, the messaging initiation control 305 may be a link, the link comprising a uniform resource identifier (URI). The messaging initiation control 305 may deep link into an application on the client device 301. Such an application may be, without limitation, a native application or a web application comprising a messaging client. The application may be identified according to various techniques for deep linking. A messaging client may receive a URI and extract an identifier that identifies the messaging bot with the messaging system so as to empower the messaging client to direct the user of the messaging client to a message thread with the messaging bot.

Figure 3B:
FIG. 3B illustrates an embodiment of a user interface for a message thread displaying a get-started message.

FIG. 3B illustrates an embodiment of a user interface 310 for a message thread displaying a get-started message 1015.

The client device 301 may display a messaging client in response to the selection of a messaging initiation control 305 on a web page. It will be appreciated, however, that the display of the messaging client may also be initiated by a user using other techniques, such as the direct selection of the messaging client in an application-selection user interface for the operating system of the client device 301. Further, the display of a message thread with a messaging bot with a get-started message 1015 may be initiated within the messaging client—such as through a selection of the messaging bot or a selection of a message thread with the messaging bot—rather than in response to the selection of a control embedded in a web page.

A messaging client may display a messaging client header 312. The messaging client header 312 may comprise a title for a message thread, such as the name of a messaging bot with which the user may engage via the message thread, which may correspond to the name of a business that the messaging bot represents. The messaging client header 312 may comprise a control to return a user to an inbox view for the messaging client. An inbox view control may be augmented with a number of recent message threads with unread messages.

The user interface 310 for the message thread may include a messaging bot information display 314. The messaging bot information display 314 may include a name and avatar for the messaging bot with which the message thread is associated. The avatar for a messaging bot may be a logo for a business with which the messaging bot is associated. The messaging bot information display 314 may include a category for the messaging bot, such as a type of commerce associate with the messaging bot. For example, the messaging bot information display 314 includes the "Shopping & Retail" category. These categories may be selected by an operator for the messaging bot associated with a business for the messaging bot or may be assigned by the consumer-to-business messaging system 100. The messaging bot information display 314 may include a listing of the number of people who have liked, favorite, or otherwise associated themselves with the messaging bot and/or the business or a page for the business. In some embodiments, the messaging bot information display 314 may eventually be removed from the initial display of a message thread when activated once sufficient messages are received as to occupy its screen space.

The user interface 310 for a message thread may include composition controls 319 that are persistently visible during the display of a message thread. Many, most, or nearly all of the composition controls 319 may empower access to further user interface controls for the performance of various tasks, such as text entry, media selection, emoji selection, camera use, a social approval icon, etc.

The user interface 310 for the message thread may comprise a message interaction display 313. The message interaction display 313 may comprise the messages exchanged within the message thread. The message interaction display 313 may be initially empty due to no messages having been exchanged at the time of the creation of the message thread.

However, in some embodiments, a get-started message 315 may be automatically displayed in a first access to a message thread with a messaging bot by the user. A get-started message 315 may comprise one or more CTA controls for initiating service with the messaging bot, such as different product areas offered by a business. A message thread may include a display of messaging bot information and/or business information, such as a product or service category (e.g., "Shopping & Retail") and a number of people who have liked the business page for the business.

A get-started message 315 may include one or more CTA controls. A CTA control 316 displayed as part of the get-started message 315 may be oriented towards guiding a user's initial interactions with a messaging bot, and as such may ask broad or general questions regarding a user's interest in interacting with the messaging bot. However, any type of CTA control may be displayed.

Figure 3C:
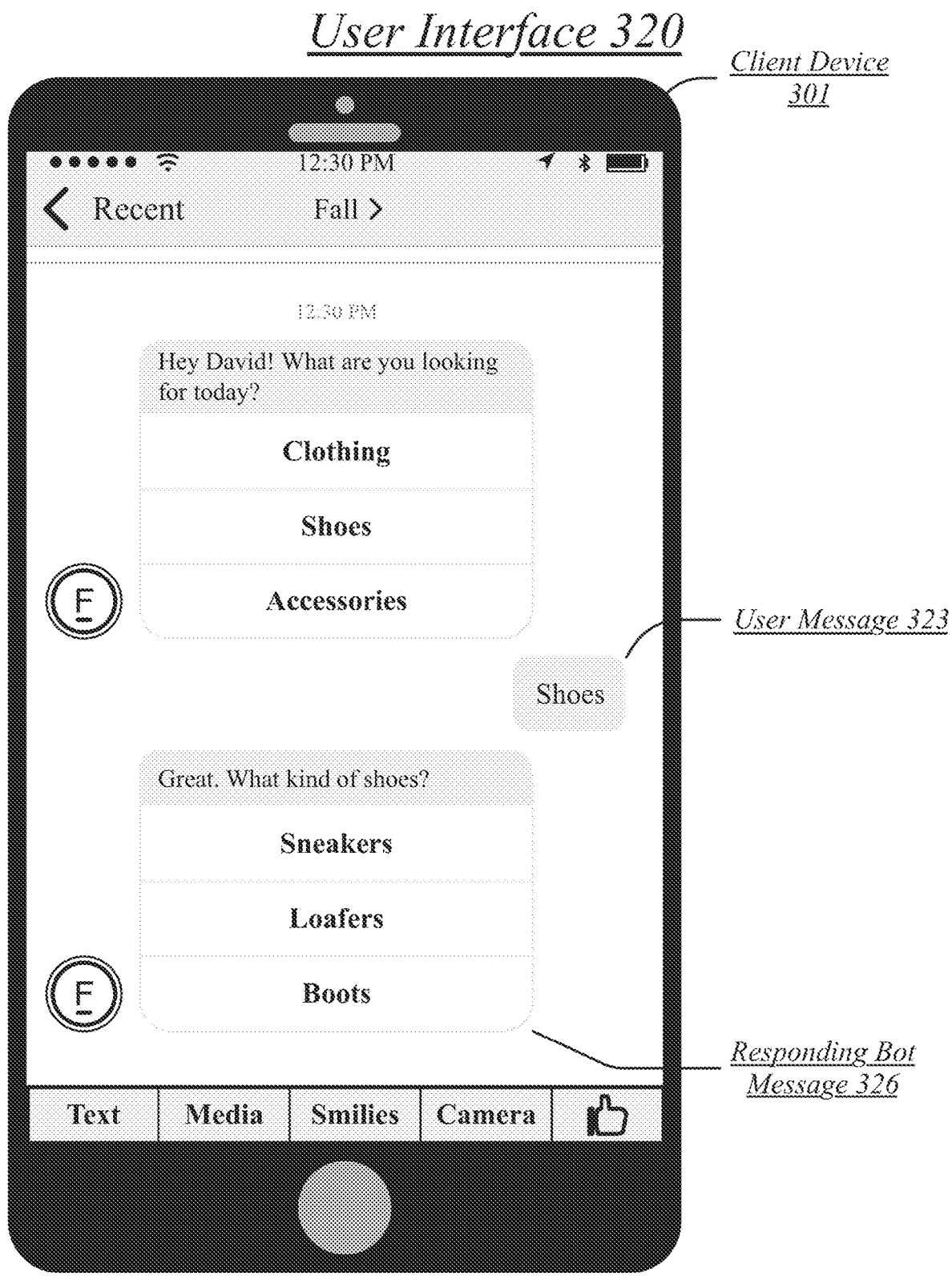
FIG. 3C illustrates an embodiment of a user interface for a message thread displaying a user message and responding bot message.

FIG. 3C illustrates an embodiment of a user interface 320 for a message thread displaying a user message 323 and responding bot message 326.

The user message 323 may comprise a user response to messaging bot options presented in the message thread. In some cases, the user message 323 may be automatically generated based on a user selecting a CTA control. The user may select a CTA control, which may initiate the sending of a message to the business as addressed to the messaging bot. At least a portion of this message may be displayed in the message thread to display the flow of the messaging conversation to the user, in this case that the user has selected the "Shoes" option from the plurality of CTA controls of the get-started message 315. This same text may be sent to the messaging bot to indicate the selected control. In some implementations, additional information may be sent to the messaging bot, and not displayed to the user, such as metadata indicating that a particular control was selected. In some cases, a user may respond to a series of options by entering the text option via text controls, such as by typing and sending "Shoes" via the messaging interface.

The responding bot message 326 may comprise a response to the user message 323 by the messaging bot. The responding message 326 may comprise further CTA controls empowering the refinement of a user's configuration of a requested product or service. The plurality of CTA controls may be received as part of a template, where the template includes a text segment as a message to the user and allows the specification of one or more CTA controls.

Figure 3D:
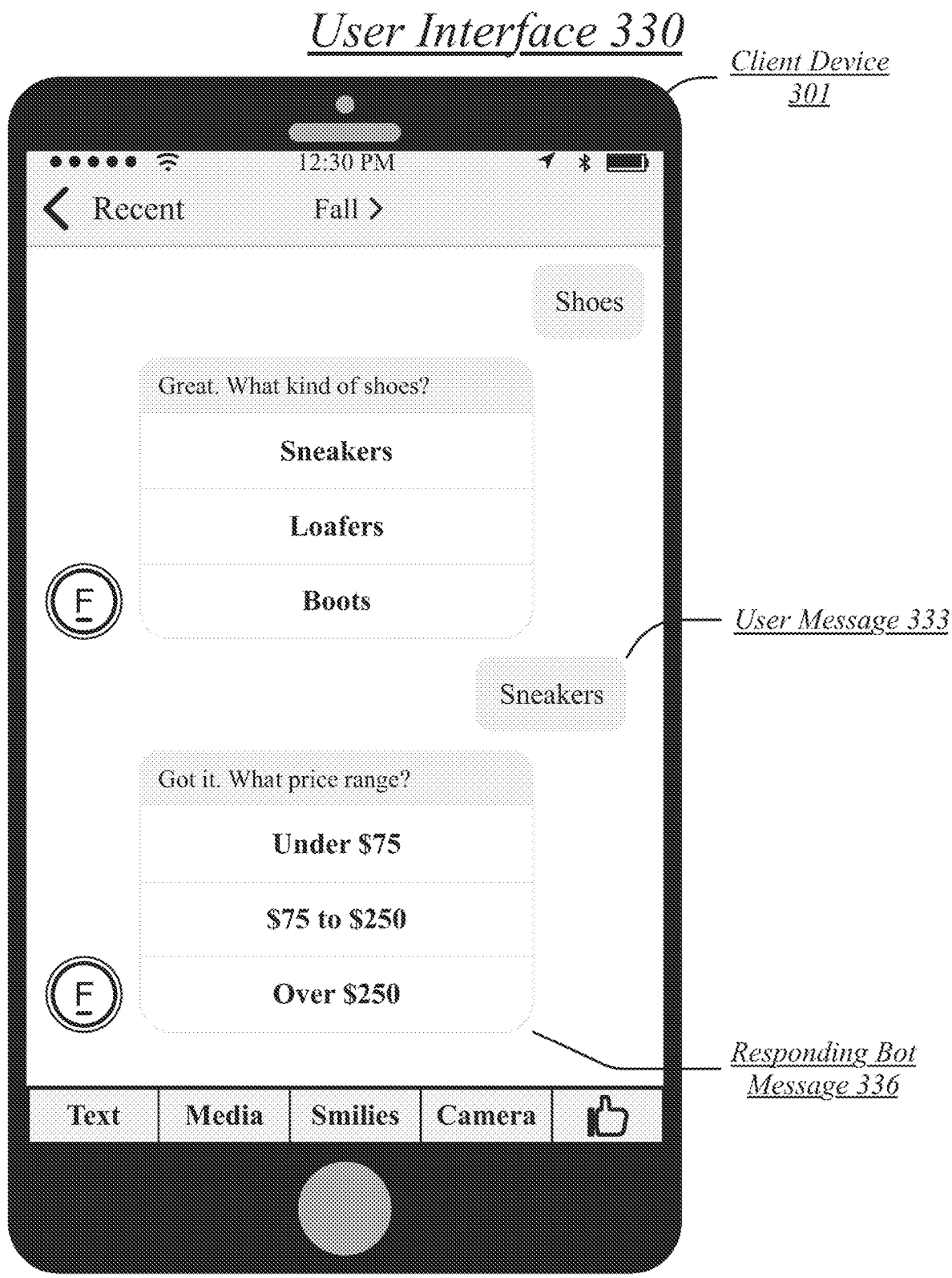
FIG. 3D illustrates an embodiment of a user interface for a message thread displaying a user message and a responding bot message.

FIG. 3D illustrates an embodiment of a user interface 330 for a message thread displaying a user message 333 and a responding bot message 336. The user message 333 and the responding bot message 336 may further refine a user's configuration of a requested product or service.

Figure 3E:
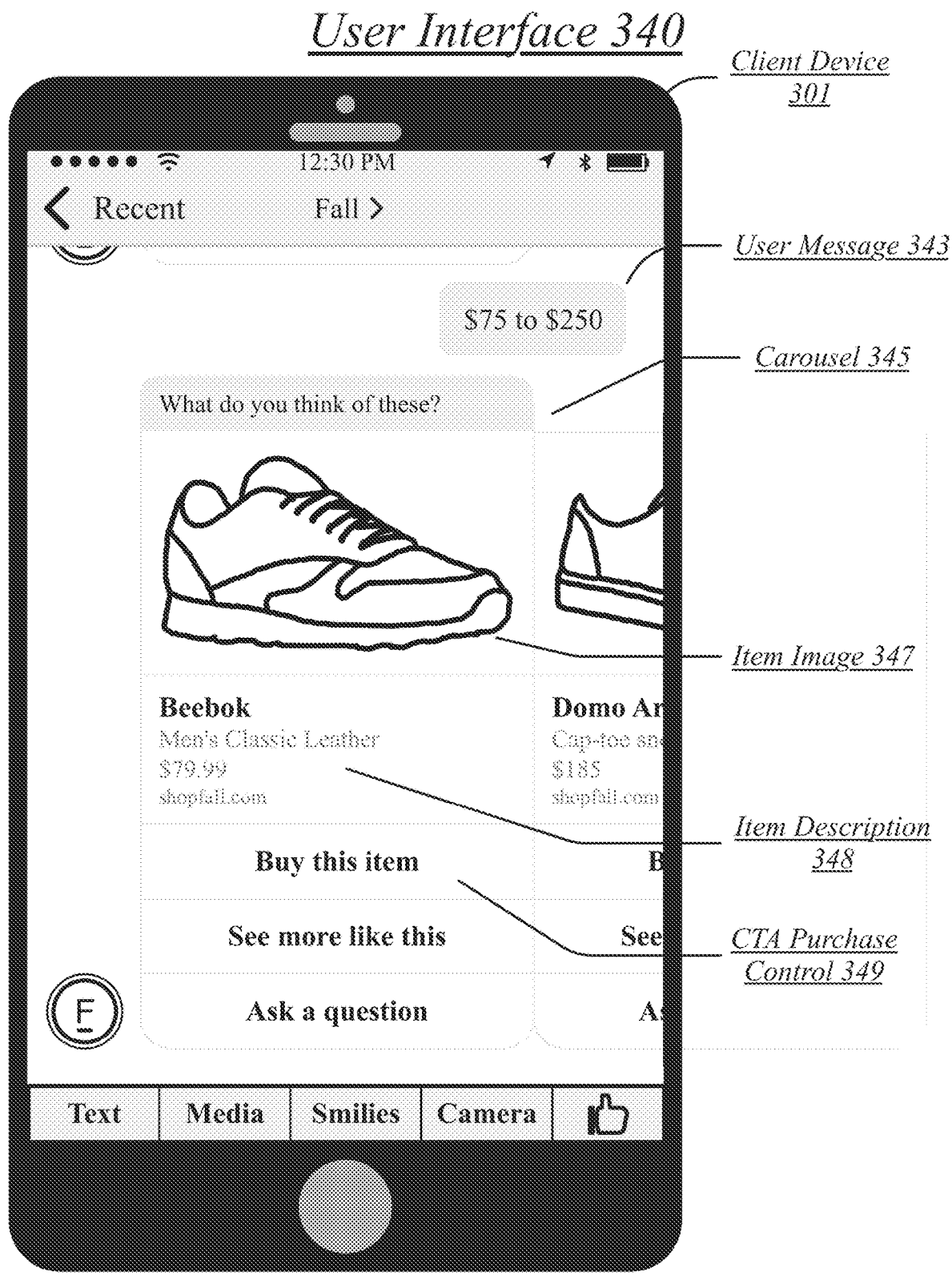
FIG. 3E illustrates an embodiment of a user interface for a message thread displaying a carousel.

FIG. 3E illustrates an embodiment of a user interface 340 for a message thread displaying a carousel 345. In some instances, a messaging bot may send a bot message that comprises a carousel 345, such as in response to a user message 343.

A carousel 345 may comprise a template empowering the sending of multiple items for display, each with one or more associated CTA controls. The carousel 1045 may comprise a title, the title used as a message to the user contextualizing the carousel 345, such as inviting the user to consider a variety of options. The carousel 1045 may comprise a plurality of items, where each items comprise an item image 347 (e.g., an image of the product), text (e.g., an item description 348 as descriptive text for the product), and a plurality of controls (e.g., a buy control as a CTA purchase control 349, a see-more-like-this control, and an ask-a-question control). The carousel 345 may be scrolled horizontally to view additional items, though vertical carousels may also be supported by the consumer-to-business messaging system 100. In some embodiments, a title for the carousel may be sent as a distinct message from the horizontally-scrollable set of items comprising the carousel.

Figure 3F:
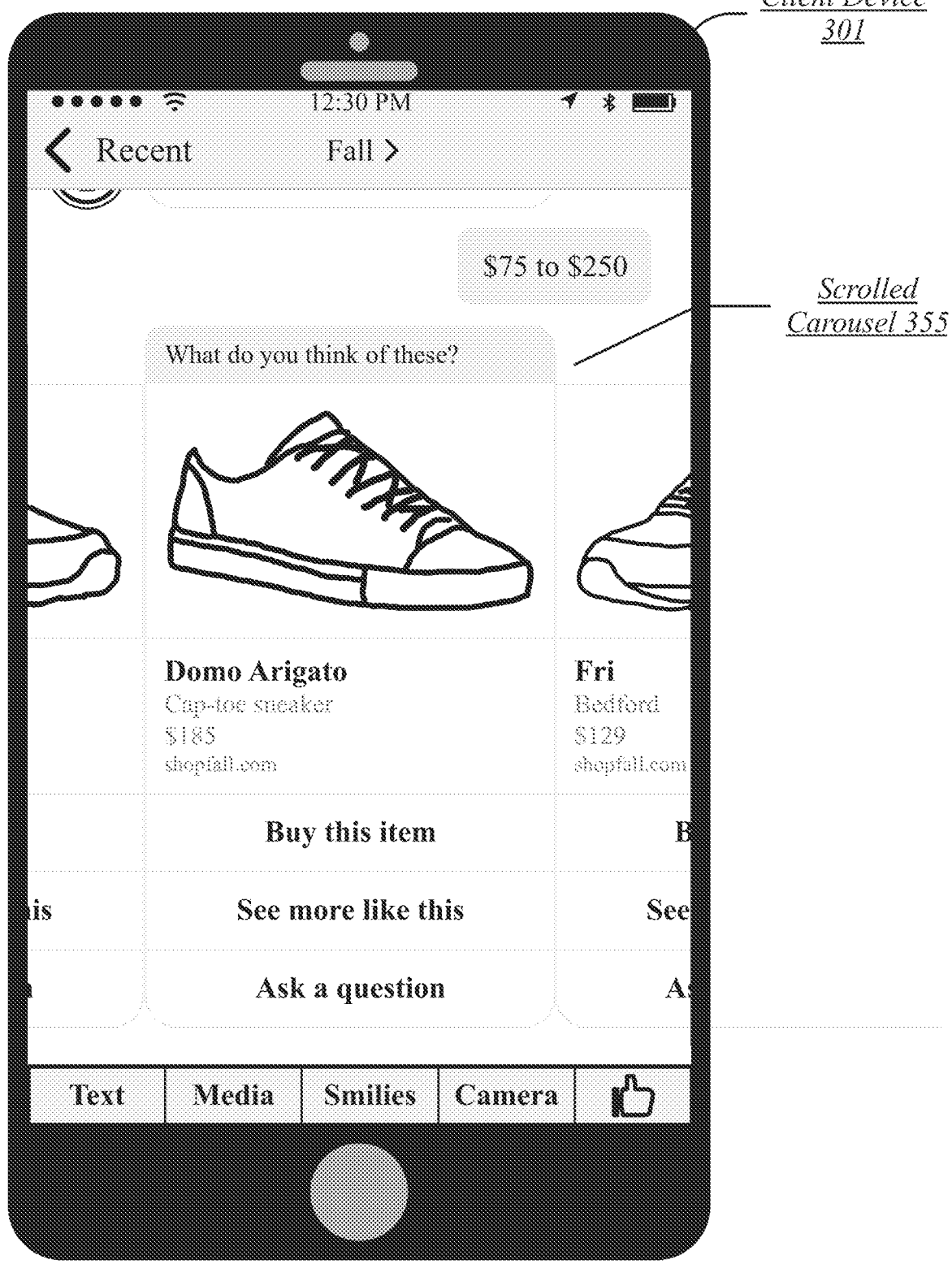
FIG. 3F illustrates an embodiment of a user interface for a message thread displaying a scrolled carousel.

FIG. 3F illustrates an embodiment of a user interface 350 for a message thread displaying a scrolled carousel 355.

The scrolled carousel 355 may comprise a carousel 345 that has been horizontally scrolled by the user to display additional items, each comprising an image, text segment, and plurality of CTA controls. The title for the carousel may remain in position to continue to contextualize the plurality of items. The messaging client may be operative to perform intelligent scrolling of a carousel so as to automatically position an entire display of a particular item for view rather than stopping scrolling in a transition point between two items.

Figure 3G:
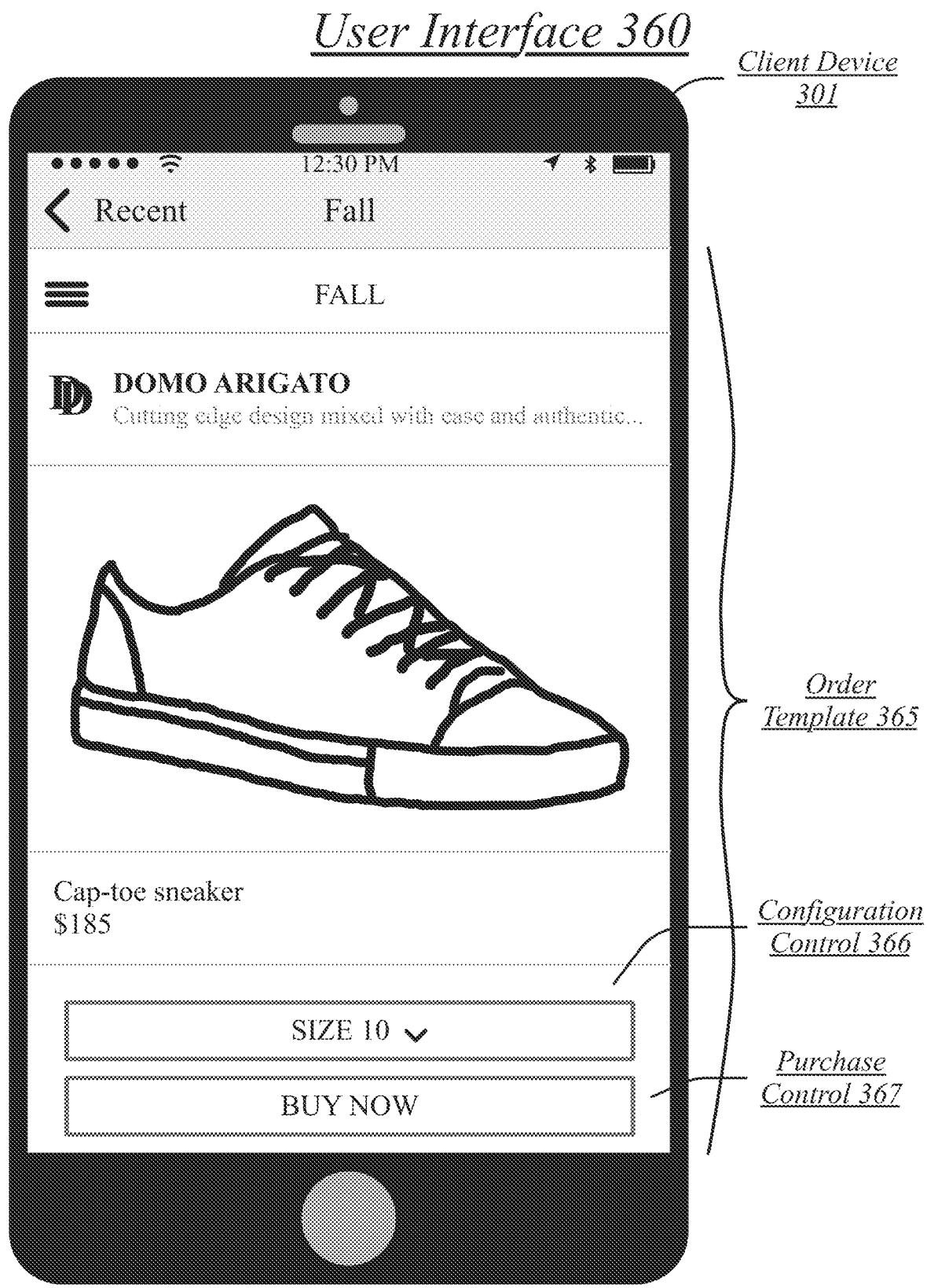
FIG. 3G illustrates an embodiment of a user interface for a message thread displaying an order template.

FIG. 3G illustrates an embodiment of a user interface 360 for a message thread displaying an order template 365.

An order template 365 may comprise a form used to configure the purchase of a particular product. The order template 365 may comprise one or more images—such as product images that may be scrolled between—a name of the product, a description of the product, a price for a product, and one or more controls for configuring options for the product (e.g., a configuration control 366 empowering configuration of the size of a pair of shoes).

The order template 365 may comprise a purchase control 367 empowering purchase of the product. In some embodiments, a purchase control 367 may be prebuilt CTA in which a financial transaction for a purchase is processed by the consumer-to-business messaging system 100, with a confirmation of the financial transaction sent to the business for the messaging bot to confirm payment and initiate delivery of the product.

Figure 3H:
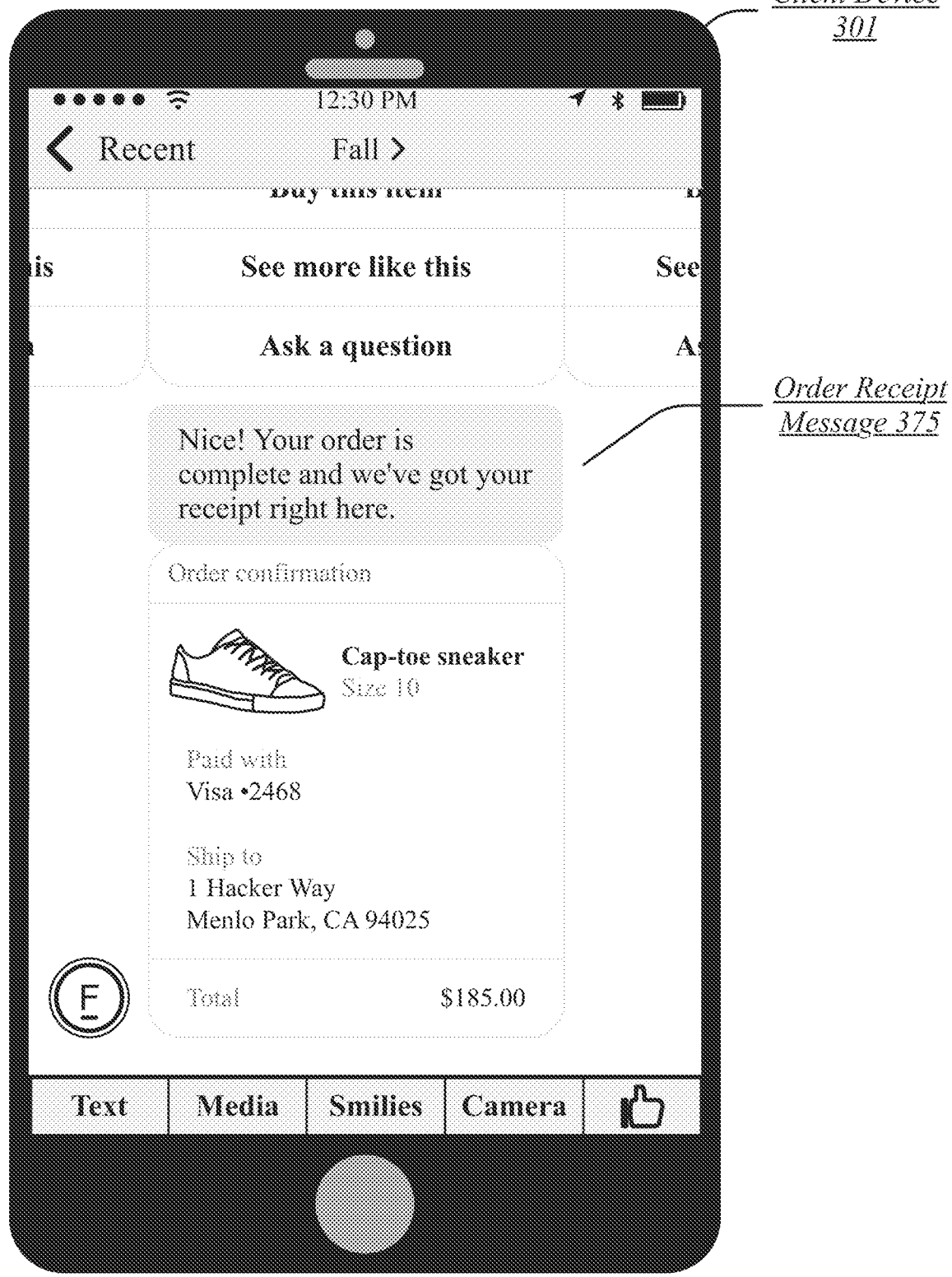
FIG. 3H illustrates an embodiment of a user interface for a message thread displaying an order receipt message.

FIG. 3H illustrates an embodiment of a user interface 370 for a message thread displaying an order receipt message 375.

An order receipt message 375 may comprise a message template providing a receipt for a purchased product or service. The order receipt message 375 may comprise a personal message to the user customized by the business for the messaging bot, such as thanking or congratulating the user for their purchase. The order receipt message 375 may comprise a title (e.g., that it is an order confirmation), an image of the product, a text description of the product, a text description of any configured options, a payment description, a delivery summary, and a price. A template for receipt messages may be provided so as to instruct businesses as to the information that should be provided to a user as part of their receipt. In some embodiments, a portion of an order receipt message 375 may be specified by the consumer-to-business messaging system 100, such as a payment description section where a financial transaction is performed by the consumer-to-business messaging system 100 on behalf of the user and the business.

Figure 4A:
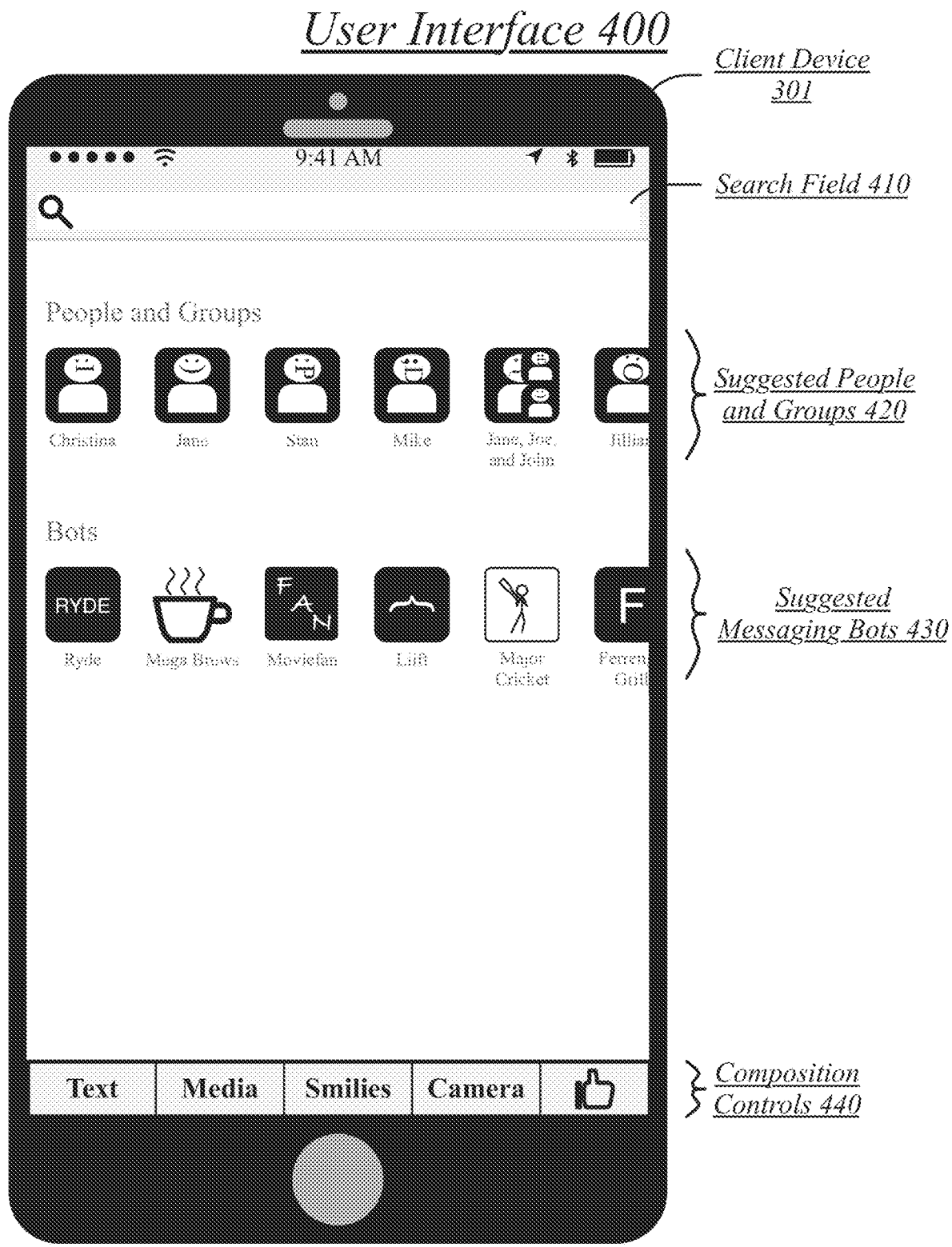
FIG. 4A illustrates an embodiment of a user interface for search.

FIG. 4A illustrates an embodiment of a user interface 400 for search.

A search interface may comprise a search field 410, the search field 410 empowering a user to enter text for use in a search. The search interface may comprise composition controls 440. The composition controls 440 may be substantially similar to the composition controls 319 described with reference to FIG. 3B, and may similarity empower access to further user interface controls for the performance of various tasks, such as text entry, media selection, emoji selection, camera use, a social approval icon, etc.

A search interface may also comprise one or more suggested contacts, wherein these suggested contacts are displayed in an initial display of the search interface prior to the user entering search information prompting the display of search results in response to the entered search information. The suggested contacts may therefore augment the search interface into a discovery interface, wherein the discovery interface initially displays suggestions for a user without the use of user-specified search information and then transitions to suggestions based on user-specified search information.

The suggested contacts may be determined based on user information and contextual information, and therefore may comprise predictions as to the people, groups, and/or messaging bots that a user may desire to contact. The suggestion of contacts may incorporate, as well as predictions as to user interest, an incorporation of value to the consumer-to-business messaging system 100 in the user messaging with the contact. Suggested contacts may include people, such as suggested people and groups 420. Suggested contacts may include suggested messaging bots 430.

Figure 4B:
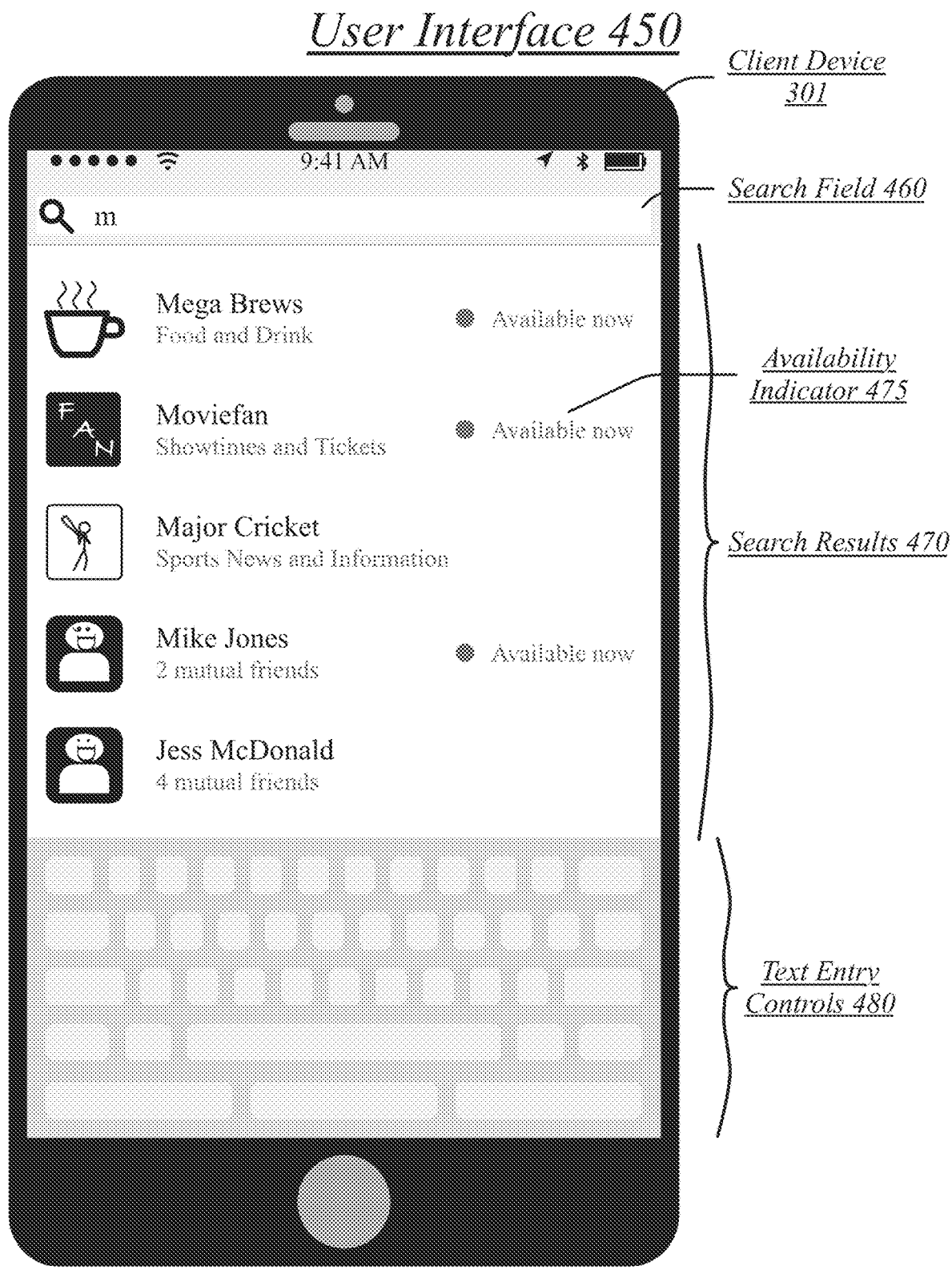
FIG. 4B illustrates an embodiment of a user interface for search results.

FIG. 4B illustrates an embodiment of a user interface 450 for search results 470.

The search interface may comprise a search field 460, which may comprise a complete or partial entry of text. The search results 470 may be updated as additional text is entered in the search field 1160. For instance, text entry controls 480 may be used to enter text into the search 460. Text entry controls 480 may be reached by selecting a text entry selection control as part of composition controls 440 as described with reference to FIG. 4A.

The search results 470 may comprise matches to the text of the search field 460. The search results 470 may comprise suggested results based on the text of the search field 460, which may be ranked and displayed in order based on one or more of predicted user interest and promotion value to the consumer-to-business messaging system 100. As illustrated, the search results 470 may include a plurality of different types of contacts. Search results 470 may include personal contacts (e.g., friends or previous individual messaging partners), groups (e.g., previous or otherwise available group conversation), and/or businesses as represented by messaging bots. Alternatively, in some embodiments, a search interface may be provided that is exclusive to messaging bots in which all search results 470 will be messaging bots.

Search results 470 may include information about one or more of the results. Included information may comprise one or more of a number of mutual friends for a contact, a product or service area for a messaging bot, and an indication of whether a personal or messaging bot search result is currently available for messaging. For instance, an availability indicator 475 may be displayed in association with all those and only those contacts that are currently available for messaging. The consumer-to-business messaging system 100 may determine availability according to a variety of techniques, such as whether the consumer-to-business messaging system 100 currently has network connectivity to a client device associated with the contact.

Figure 5:
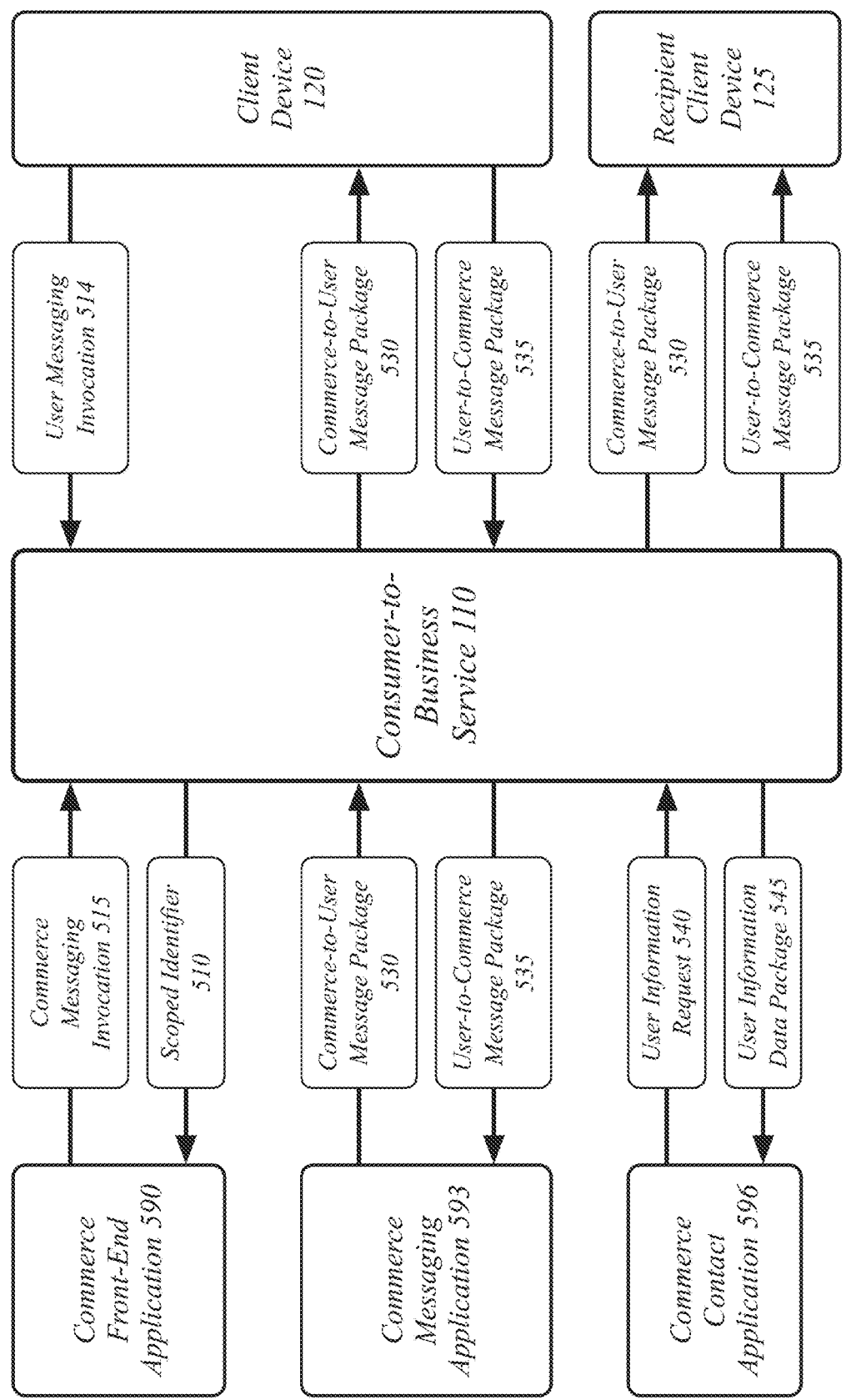
FIG. 5 illustrates an embodiment of the consumer-to-business messaging system engaging in messaging operations.

FIG. 5 illustrates an embodiment of the consumer-to-business messaging system 100 engaging in messaging operations.

A commerce entity, such as a business, may be represented via one or more commerce applications 190 in its interactions with the consumer-to-business messaging system 100. These commerce applications 190. The commerce applications 190 may be used by human agent, representative, or other operator performing human-based actions for the commerce entity. A commerce application may comprise a commerce front-end application 590, commerce messaging application 593, and/or commerce contact application 596. Other commerce applications may be used, with various functions implemented by different commerce applications in different embodiments. For instance, a commerce front-end application 590, commerce messaging application 593, and commerce contact application 566 may comprise distinct applications. Alternatively, any or all of a commerce front-end application 590, a commerce messaging application 593, and a commerce contact application 596 may be a common application implementing one or more of front-end, messaging, and contact features. In various embodiments, various functions may be implemented by different combinations of applications.

The consumer-to-business service 110 may aid in the development of the presence on the consumer-to-business messaging system 100 of a business. This aid may be based, at least in part, on an identification of an area of commerce in which a business operators. For example, an airline may be associated, as a business, with airline commerce and may, therefore, be provided with information and functionality to aid in the performance of operations related to the airline industry. As such, in its operations with the consumer-to-business messaging system 100, a commerce entity, such as a business, may correspond to a commerce type, such as a clothing realtor being associated with a clothing type, retail sales type, clothing retail type, etc. A commerce intermediary server may provide access to the consumer-to-business service 110 supporting a plurality of commerce types, where the commerce type of a particular commerce entity comprises one of the plurality of commerce types.

A commerce type may comprise the local travel commerce type, ride-sharing commerce type, airline commerce type, hotel commerce type, retail commerce type, or any other commerce type. Each commerce type may be support by the consumer-to-business service 110 using commerce-type-specific message templates, commerce-type-specific attachment types, commerce-type-specific forms, or other commerce-type-specific templates. For instance, the airline commerce type may be supported by airline-specific messages templates for communicating airline information (e.g., arrival times, department times, departure gate specifications, baggage claim specifications, connecting flight specifications, flight delay updates), airline-specific attachment types for providing air-transport information (e.g., a ticket receipt, a boarding pass, a baggage claim ticket), airline-specific forms for configuring air-transport services (e.g., booking a ticket, rescheduling a ticket, checking-in to a flight, arranging for checked baggage), and other airline-specific templates. These templates may reduce the burden of effort in an airline, or other business, in supporting the consumer-to-business messaging system 100, reduce the duplication in effort between businesses in creating templates, and may standardize and improve the quality of the templates used by businesses.

For example, prebuilt templates may include different combinations of text, images, titles, subtitles, and CTA buttons. Templates may be combined together, such as sending multiple messages in one call to the messaging system to invoke the rendering of them as a single stack. A stack of messages may be presented as a scrollable horizontal or vertical arrangement of a list of items, such as may be used when sending a variety of suggested products to a user. Similarly, controls may be presented as a unit. A form template may be used to specify multiple controls, which may also include text or images. A user may be presented a form with a title text inviting them to select an option, with each of the options presented in a vertical or horizontal stack, with each of the options selectable by the user and invoking an action with the business, such as by having each of the options be a CTA control. For example, a user ordering up of coffee while on their way to a coffee shop may be presented with a dialog, built out of a form, listing the available sizes of coffee as options. The selected size may be posted back to the business as a message as each of the options may be configured with a particular message to send to the business when selected.

The instantiation of a messaging relationship between a business and a user may be invoked by either party. Such an invocation may be referred to as a user-to-commerce invocation. The consumer-to-business service 110 may receive a user-to-commerce invocation associated with a commerce entity in association with a user account. A user-to-commerce invocation may comprise an invocation of a messaging relationship between a particular user and a particular commerce entity. The user-to-commerce invocation may comprise a commerce messaging invocation 515 sent by a commerce front-end application 590 used by a representative of the commerce entity. Alternative, the user-to-commerce invocation may comprise a user messaging invocation 514 sent by a user client device 120. The consumer-to-business service 110 may generate a scoped identifier 510 in response to the user-to-commerce invocation.

A scoped identifier 510 may comprise an identifier, such as a numerical identifier, that identifies a user within a particular scope narrower than the entire scope of the consumer-to-business messaging system 100. This empowers the consumer-to-business messaging system 100 to control the scope of privileges and information available to a commerce entity, which aids in the implementation of, for example, privacy protections for users of the consumer-to-business messaging system 100. For instance, the scoped identifier 510 may be a page-scoped identifier, with the scoped identifier 510 identifying a user for the business entity across the scope of a business page, with the scoped identifier 510 a unique identifier for a user account within a particular business page, but independent of an identifier that may be used for the user account in regards to other business pages. A page-scoped identifier may be usable by any of one or more commerce applications powering a business page, the page-scoped identifier thereby unifying the identification of a user across multiple commerce applications and empowering the coordinated support of a user by a commerce entity. A page-scoped identifier may be submitted to the consumer-to-business service 110 by a commerce application in association with a page identifier for a business page, the combination of the page identifier and page-scoped identifier identifying a single user account.

The use of a scoped identifier 510, such as a page-scoped identifier, may serve to protect the privacy of a user through a variety of techniques. These privacy protections may be enforced at the application programming interface (API) level by the consumer-to-business service 110. By being limited in scope to a particular business page, the tracking of a user between business pages may be partially or wholly restricted to the consumer-to-business service 110 and therefore subject to the privacy protections of the consumer-to-business service 110. Further, the consumer-to-business service 110 may restriction the information available to a commerce entity until a user has consented to the sharing of information. For instance, the consumer-to-business service 110 may restrict the providing of name information (e.g., a full name, a first name, a last name), contact information (e.g., an email address, a postal address, a phone number), and/or biographical information (e.g., age, data of birth, gender, sex, race, ethnicity) until the user has provided consent to the sharing of such information. In some embodiments, the consumer-to-business service 110 may infer user consent if the user messages—engages in messaging—with the commerce representation (i.e., business page) or a commerce entity for sharing of information in reference to the page-scoped identifier for a business page, and infer lack of user consent if the user has not messages with the commerce representation.

The consumer-to-business service 110 may send the scoped identifier 510 to the commerce front-end application 590 in response to the user-to-commerce invocation. The scoped identifier 510 sent to the commerce front-end application 590 may comprise a page-scoped identifier, the page-scoped identifier specific to a commerce representation, such as a business page, identified based on its associated to the user-to-commerce invocation. The consumer-to-business service 110 may send a scoped identifier 510 to a commerce front-end application 590 from a commerce intermediary server, the commerce front-end application 590 associated with a commerce entity, the scoped identifier 510 identifying a user account with a messaging system in relation to a commerce representation for the commerce entity within the messaging system. This may, as a result, authorize an operator of the commerce front-end application 590 to engage in messaging with the user via the consumer-to-business messaging system 100.

An invocation of a message thread with a commerce entity by a user may mark the initiation of a messaging relationship between the user and the commerce entity. The message thread may be invoked by selecting the commerce entity in an interface for a messaging client. Different techniques may be used to find the commerce entity in the messaging client. The messaging client may present a discovery interface for the exploration and discovery of various commerce entities available via the consumer-to-business messaging system 100. Alternatively, the user may have commerce entities promoted to them outside a discovery interface. Such promotion may occur within in a messaging inbox, within a message thread, or in any other portion of the messaging client. For example, a user may be promoted a commerce entity in response to the content of a message thread.

A user-to-commerce message thread invocation may be received from a client device 120 associated with the user account, where the user-to-commerce message thread invocation is in association with a commerce-entity discovery interface on the client device. A commerce-entity discover interface may display a plurality of commerce representations for commerce entities and empower the selection of a particular commerce representation for a particular commerce entity. The consumer-to-business service 110 may send the scoped identifier 510 to the commerce front-end application 590 in response to receiving the user-to-commerce message thread invocation from the client device 120. The commerce front-end application 590 may, for instance, be registered for the receiving of scoped identifiers for users that select a commerce representation via a discovery interface.

A user-to-commerce message thread invocation may be received from a client device 120 associated with the user account, where the user-to-commerce message thread invocation is in association with a commerce-entity trigger suggestion on the client device 120. A commerce-entity trigger suggestion may comprise a suggestion displayed on the client device 120 in response to the context of a messaging conversation, such as in a user-to-user message thread. A client device 120, in coordination with the consumer-to-business service 110, may detect a context for a user-to-user message thread and suggest commerce options in response to the context, with may comprise the commerce-entity trigger suggestion. The consumer-to-business service 110 may send the scoped identifier 510 to the commerce front-end application 590 in response to receiving the user-to-commerce message thread invocation from the client device 120.

A user-to-commerce invocation may be received in association with a web plugin on a web page associated with the commerce entity. The consumer-to-business messaging system 100 may empower commerce entities to add a web plugin to web pages for their business, with the web plugin empowering users to select a control invoked by the web plugin for access to the consumer-to-business service 110 in association with the particular commerce representation for the commerce entity. The consumer-to-business service 110 may send the scoped identifier 510 to the commerce front-end application 590 in response to receiving the user-to-commerce invocation in association with a web plugin. As such, a businesses may promote their presence on the consumer-to-business messaging system 100 on their web page and therefore encouraging the extension of their interaction with their customers to the messaging platform of the consumer-to-business messaging system 100.

A business may promote its presence on the consumer-to-business messaging system 100 in physical displays as well as in web displays. The consumer-to-business service 110 may receive a user-to-commerce invocation from a client device 120 associated with the user account, the user-to-commerce invocation in association with a visual code capture by the client device 120, the visual code capture identifying the commerce entity. A visual code may comprise, for instance, a barcode, a matrix barcode, a one-dimensional barcode, a two-dimensional barcode, a consumer-to-business messaging system-specific barcode, or any other form of visual code. The consumer-to-business service 110 may send the scoped identifier 510 to the commerce front-end application in response to receiving the user-to-commerce invocation from a client device. A visual code may be captured by a camera of a client device 120 and thereafter submitted to the consumer-to-business service 110.

The consumer-to-business service 110 may be operative to perform phone-number matching for a business of phone numbers of customers of the business. A commerce messaging invocation 515 may comprise a submission of one or more customer phone numbers from a business. The consumer-to-business service 110 may receive a phone number record from a commerce front-end application 590, match the phone number record to a user account, and send a scoped identifier 510 for the user account to the commerce front-end application 590 in response to matching the phone number record received from the commerce front-end application 590 to the user account. As such, a business may be empowered to transition from using phone call or short message service (SMS) contact to using the consumer-to-business messaging system 100 for communication with its customers. This may provide the business with reliable message delivery including message receipts, as compared to potentially unreliable SMS service. This may provide both customers and businesses with the rich commerce interfaces that may be made available by the consumer-to-business service 110, thereby potentially increasing a customer's use of a business and the customer's ease of using the business.

The consumer-to-business service 110 may receive a user account access associated with the user account to the commerce representation for the commerce entity within the messaging system. For instance, the user may visit a business page for a business via their client device 120. The business may be provided with the scoped identifier 510 in case they wish to follow up with a user following their visit to the business page. The consumer-to-business service 110 may send the scoped identifier 510 to the commerce front-end application in response to receiving the user account access.

The consumer-to-business service 110 may receive a commerce-to-user message package 530 from a commerce messaging application 593 associated with the commerce entity, the commerce-to-user message addressed to the scoped identifier 510, the commerce-to-user message package 530 comprising a commerce-to-user message. The consumer-to-business service 110 may identify the user account based on the scoped identifier. The commerce-to-user message package 530 may comprise both a page-scoped identifier and a page identifier, which may, in combination, uniquely identify a user account. The consumer-to-business service 110 may send the commerce-to-user message to a client device 120 associated with the user account. The sending of a message to a client device 120 may comprise push and/or pull operations as part of the operation of a messaging client with a messaging system 140.

A commerce-to-user message package 530 may be addressed to a specific message thread by the commerce messaging application 593. The message thread may be a user-to-commerce message thread uniquely associated with the combination of a particular user account and commerce representation (e.g., business page). As such, the consumer-to-business service 110 may receive a commerce-to-user message package 530 at a commerce intermediary server from a commerce messaging application 593, the commerce messaging application 593 associated with a commerce entity, the commerce-to-user message package 530 addressed to a message thread with a messaging system 140.

In some embodiments, a commerce-to-user message package 530 may be specified according to a custom message template associated with the commerce entity. A custom template may be define according to a scripting language, such as JavaScript™. The consumer-to-business service 110 may provide tools for the creation of custom templates, such as custom message templates. These tools may provide a live preview of the custom template. Custom templates, including custom message templates, may be subject to a review by a human administrator of a consumer-to-business service 110, which may be performed as part of an application review process. Custom templates may be defined and approved in association with a specific commerce application.

The consumer-to-business service 110 may receive an application registration package in association with the commerce messaging application 593. The consumer-to-business service 110 may register the commerce messaging application 593 for access to a commerce intermediary server in response to the application registration package. The application registration package may define various custom templates for use in its communication with users. An application registration package may define one or more of a custom message template, a custom form template, and a custom call-to-action button.

A call-to-action button may comprise a control empowering access to a particular action with an associated visual representation inviting the user to engage in that action. Some call-to-action buttons may be prebuilt in the consumer-to-business messaging system 100 and provided to businesses for use with their commerce applications. For instance, call-to-actions buttons for any or all of location sharing, content sharing, and tokenized payments may be made available for use with commerce applications. Custom versions for some of these functions may also be built by businesses, such as where only a general location is used by a commerce application (e.g., at the specificity of a city), so that a less-specific location sharing call-to-action button is used that can take advantage of lower-power location-determination techniques. Custom CTAs can be used either with custom templates, or as a CTA included as an element of a prebuilt template.

An application registration package may define one or more of a custom welcome text message for the message thread, a custom get-started call-to-action button for the message thread, one or more custom pestilent call-to-action buttons for the message thread, and one or more custom dynamic triggers to start an interaction. A get-started call-to-action button may comprise a button displayed during an initial access by a user to a user-to-commerce message thread, the get-started call-to-action button initiating initial functions for a user's interactions with a business. Pestilent call-to-action buttons may provide access to interactions with a business that may retain their usefulness persistently across a user's relationship with a business, such as invoking an order process or requesting an order status update. Custom dynamic triggers may associate context, such as inferred intent, from a message thread with commerce actions.

An application registration package may define a custom call-to-action button, the custom call-to-action button comprising visual representation information and activation response information, the activation response information comprising one or more of a uniform resource locator (URL), an application link, and a messaging invocation. A selected call-to-action button with activation response information comprising a URL may invoke a web access to that URL. A selected call-to-action button with activation response information comprising an application link may invoke an access to an application using the application link. A selected call-to-action button with activation response information comprising a messaging invocation may transmit a message to a commerce messaging application 593.

The custom templates for a commerce application, or for a plurality of commerce applications, may be provided to one or more client devices of a user in response to a user engaging with a commerce representation powered by the one or more commerce applications. The consumer-to-business service 110 may send one or more of a custom message template, a custom form template, and a custom call-to-action button to the client device in response to the client device 120 accessing a commerce entity within the messaging system 140.

In response to receiving a commerce-to-user 330 message package from a commerce messaging application 593, the consumer-to-business service 110 may determine commerce access privileges for the commerce messaging application 593 in association with the message thread. The commerce access privileges may determine whether the commerce messaging application 593 has permission to post a commerce-to-user message package 530 to the message thread. The consumer-to-business service 110 may send the commerce-to-user message package 530 to a client device 120 associated with the message thread when the commerce access privileges indicate access to the message thread and reject the commerce message package when the commerce access privileges reject access to the message thread. This message thread may be associated with a user account for a user of the messaging system, the user identifier comprising a page-scoped identifier for the user account, the page-scoped identifier identifying the user account with the messaging system in relation to a commerce representation for the commerce entity within the messaging system, such as a businesses page.

Commerce access privileges may be determined according to a limited-time access token received in association with the commerce message package. The consumer-to-business service 110 may provide a limited-time access token in response to a user engaging with a business in a user-to-user message thread. For instance, a user may engage a commerce interface in a user-to-user message thread for the arrangement of a business service. This user engagement, in some cases whether or not the arrangement of the service is completed, may authorize the commerce entity to send messages to the user-to-user message thread for a limited, defined period of time in order to engage with the one or more users in the thread for the arrangement of the service. As the message thread may be a user-to-user message thread, the commerce-to-user message package 530 may also be sent by the consumer-to-business service 110 to an additional recipient client device 125 used by a different user also involved in the user-to-user message thread, or a plurality of additional recipient client devices, each used by another user of a plurality of other users involved in the user-to-user message thread. Similarly, messaging in a user-to-user message thread by a user directed to a commerce entity may also be sent to other participants in the user-to-user message thread via a distribution of a user-to-commerce message package 535 to other recipient client devices associated with other users.

The commerce access privileges may be determined according to a sponsored messaging request associated with the commerce-to-user message package 530. A sponsored messaging request may be associated with a payment from a business to the consumer-to-business service 110 to gain the privilege to contact users. Where a business requests to send a commerce-to-user message package 530 to a message thread outside of the authorization granted in response to user engagement with the business in the message thread, the consumer-to-business service 110 may engage with the commerce entity to authorize the sending only once payment is made.

The consumer-to-business service 110 may enforce spam prevention policies to prevent abuse of the consumer-to-business system messaging 100. As such, the commerce access privilege may be determined according to a message throttling policy. A commerce entity, commerce representation, or commerce application may be subjected to a limit in a number of messages it may send in a defined time period. The consumer-to-business service 110 may select a commerce access privilege for automatic sampling based on an automatic sampling policy. A sample of messages sent by a commerce application may be collected and subjected to human review, with the privilege of the commerce application or commerce entity to submit messages to users cut off if a particular proportion of the human review indicates that spam is being sent. The consumer-to-business service 110 may additionally or alternatively perform a keyword-based spam analysis of the commerce-to-user message package and reject it or subject it to human review if the keyword-based spam analysis indicates that the message is spam.

A messaging client on a client device 120 may comprise a block control in relation to a commerce entity or commerce representation. A messaging client may receive a user block command in association with the message thread and pass the user block command to the consumer-to-business service 110, which may thereafter block access by a commerce entity associated with the message thread for messaging the user. The consumer-to-business service 110 may register a negative reputation adjustment in association with the commerce entity in response to the user block command. The consumer-to-business service 110 may maintain a reputation score for each commerce entity, and the reception of a user block command may result in the reputation score for a commerce entity being lowered.

A client device 120 or recipient client device 125 may receive a commerce-to-user message package 530 comprising a commerce-to-user message from a commerce entity via a messaging system 140. The messaging client on the client device 120 may receive the commerce-to-user message package 530 and display the commerce-to-user message in association with a user-to-commerce message thread on the client device. This commerce-to-user message may be defined according to a custom message template associated with a commerce entity, with the commerce-to-user message received from a commerce messaging application 593 registered with the messaging system 140, the commerce messaging application 593 associated with the commerce entity, the custom message template registered for the commerce messaging application 593 with the messaging system.

A messaging client on a client device 120 may comprise a user-to-commerce message thread interface for a user-to-commerce message thread. The user-to-commerce message thread interface may comprise a custom call-to-action button for the commerce entity. The messaging client may receive a user call-to-action button activation of the custom call-to-action button and generate the user-to-commerce message in response to receiving the user call-to-action button activation of the custom call-to-action button. The user-to-commerce message thread interface in a messaging client may comprise one or more of a custom welcome text message for the message thread, a custom get-started call-to-action button for the message thread, one or more custom pestilent call-to-action buttons for the message thread, and one or more custom triggers to start an interaction.

A user-to-commerce message thread may be associated with a user account, being used to organize the interactions between a user and a commerce entity. The messaging client may display a user-to-commerce discovery interface on the client device, the user-to-commerce discovery interface comprising a plurality of suggested user-to-commerce options. This plurality of suggested user-to-commerce options may be selected according to one or more of profile information for the user account and promotional consideration information for one or more commerce entities. The consumer-to-business service 110 may generate a prediction of user-to-commerce options that the user may be interested in. These options may be customized to a user based on profile information for the user's user account, such as by customizing based on the detected preferences of other users with similar profiles. The options may additionally or alternatively be customized based on a detected context for a user, such as their current location. Customizing the options may include both selecting the options for display and ranking the options. Promotional consideration information may indicate that a commerce entity has paid to receive preferential selection for inclusion in options or preferential placement within the ranking of options.

The consumer-to-business service 110 may send user credentials to a commerce entity in association with a user-to-commerce message, the user credentials included in a user-to-commerce message package 535. The user credentials may authenticate a user to the commerce application. In some cases, a user may be asked to enter their user credentials into a messaging client to empower the messaging client to use the user credentials to arrange for service with a business on behalf of the user. In some cases, however, the user credentials may be retrieved from a local application for the business. A commerce entity may be associated with a local application on the client device and the messaging client may retrieve the user credentials from the local application via deep-linking within the local application.

A consumer-to-business service 110, and in particular the messaging system 140, may receive a user-to-commerce message package 535 comprising a user-to-commerce message from a client device 120 associated with the user account. The user-to-commerce message may be addressed to a user-to-commerce message thread associated with the commerce entity. The user sending this user-to-commerce message may indicate consent by the user to engaging with the commerce entity. The consumer-to-business service 110 may set a user access consent setting for the page-scoped identifier for the user account to indicate user consent. In some cases, the user-to-commerce message may comprise a response to a commerce-to-user message sent to the client device 120 by a commerce messaging application 593 associated with the commerce entity.

A user-to-commerce message thread may comprise one of a plurality of message threads available to a user via a messaging client. A message thread selection interface may be displayed by a messaging client empowering the user to select a message thread to view. The messaging client may receive a user interface selection of a user-to-commerce message thread on a client device 120, the user-to-commerce message thread associated with a commerce entity with a messaging system 140. The messaging client may display a user-to-commerce message thread interface for the user-to-commerce message thread in response to the user interface selection. The user may compose a user-to-commerce message via a user-to-commerce message thread interface. The messaging client may receive a user-to-commerce message via the user-to-commerce message thread interface for the user-to-commerce message thread and send the user-to-commerce message to the commerce entity via the messaging system 140 as a user-to-commerce message package 535.

A user-to-user message thread may comprise one of a plurality of messages threads. A user-to-user message thread may be displayed with a user-to-user message thread interface, the user-to-user message thread interface organizing the messaging interaction between two or more users. A messaging client may receive a commerce interface control selection in the user-to-user message thread interface on a client device 120, the user-to-user message thread associated with a user-to-user message thread for a plurality of users with a messaging system 140. A commerce interface control selection may comprise a selection of a commerce entity with which to engage in a commerce interaction. The messaging client may display a commerce interface in association with the user-to-user message thread interface, the commerce interface comprising a plurality of commerce configuration options. The commerce interface being displayed in association with the user-to-user message thread interface may comprise at least a portion of the user-to-user message thread interface being visible during display of the commerce interface.

The messaging client may receive a commerce option share control selection in association with the commerce interface. The messaging client may share the plurality of commerce configuration options with the user-to-user message thread in response to the commerce option share control selection. Sharing the plurality of commerce configuration options with the user-to-user message thread may comprise posting the plurality of commerce configuration options to the user-to-user message thread as a user-to-user message. As such, the plurality of commerce configuration options may be sent as a message to a plurality of client devices associated with the plurality of users associated with a user-to-user message thread. This may encourage discussion of the commerce configuration options by the users, thereby helping the users collectively decide on the configuration of a service, such as collectively deciding on a restaurant to eat dinner at, when to eat dinner, and so forth.

Sharing the plurality of commerce configuration options with the user-to-user message thread may comprise submitting a commerce configuration option poll to the user-to-user message thread. Client devices used by members of the message thread may receive the commerce configuration option poll which may be displayed on the client devices, empowering the users to select their preferred configuration option. The user of the client device 120 that initiated the poll may also be empowered to engage in the poll or refrain from engaging in the poll. The client device 120 may receive poll result information for the commerce configuration option poll from the other client devices via the messaging system 140. The messaging client on the client device 120 may display the poll result information for the commerce configuration option poll, such as by displaying the number of votes for each of the options and/or displaying the winning poll option with the most votes. As such, the poll result information for the commerce configuration option poll may be displayed in association with the plurality of commerce configuration options in the commerce interface. The poll result information may comprise a poll winner option corresponding to one of the plurality of commerce configuration options, and the messaging client may display a poll winner indicator in association with the poll winner option in the display of the plurality of commerce configuration options in the commerce interface.

The commerce interface may be associated with a commerce entity, the plurality of commerce configuration options selected for the commerce interface according to one or more of message-thread context for the user-to-user message thread and a promotional consideration transaction with the commerce entity. Additionally or alternative, the plurality of commerce configuration options may be ranked in the commerce interface according to one or more of message-thread context for the user-to-user message thread and a promotional consideration transaction with the commerce entity. The commerce entity selected may have been promoted based on the message-thread context and/or promotional consideration. A commerce interface control selection may be for a commerce interface control, with the messaging client displaying the commerce interface control in response to one or more of message-thread context for the user-to-user message thread and a promotional consideration transaction with the commerce entity. Alternatively, the messaging client may display the commerce interface control is in response to one or more of a trigger detected in the user-to-user message thread and a discovery control selection. The messaging client may receive a commerce option selection via the commerce interface and send a commerce configuration command from the client device 120 to the commerce entity via the messaging system 140.

A commerce entity, as may be represented through a commerce messaging application 593, may respond to a user-to-commerce message. The client device 120 may receive a user-to-user message-thread message from the commerce entity via the messaging system 140 in a commerce-to-user message package. The user-to-user message-thread message may be a message addressed by a commerce entity to a user-to-user message thread. The messaging client on the client device 120 may store the user-to-user message-thread message in association with the user-to-user message thread and display the user-to-user message-thread message in the user-to-user message thread interface. The user-to-user message-thread message may also be received by a different recipient client device 125 associated with another user due to the user-to-user message thread being associated with multiple users and therefore multiple client devices.

A commerce messaging application 593 may also submit a user-to-commerce message-thread message in a commerce-to-user message package. A client device 120 may receive a user-to-commerce message-thread message from the commerce entity via the messaging system 140. The messaging client on the client device 120 may store the user-to-commerce message-thread message in association with a user-to-commerce message thread and display the user-to-commerce message-thread message in a user-to-commerce message thread interface. A user-to-commerce message-thread message may be invoked in response to actions in a user-to-user message thread, with the user-to-commerce message-thread message comprising information not designated for the user-to-user message thread. The user-to-commerce message-thread message may be received in parallel or sequence with a user-to-user message-thread message, with the former comprising information for only the user requesting a service and the latter comprising information for all participants in a user-to-user message thread. For instance, in regards to local travel, a user-to-user message thread may be provided with less-personal details, such as an arrival location and predicted arrival time, such as may be used where two or more people are coordinating meeting up. The user-to-commerce message thread may be provided with more-personal details, such as may include the pickup location, a predicted cost for the trip, a receipt for the trip, a driver identity for the trip, and/or other details relevant to the user requesting a service, but not appropriate for other users, either due to privacy protection or due to not wanting to burden the user-to-user message thread, which conversation may be ongoing, with unwanted information. Which information is delivered to which thread, user-to-user or user-to-commerce, may be configured by the commerce messaging application 593.

A commerce contact application 596 may be used to request information about a user. The consumer-to-business service 110 may receive a user information request 540 from a commerce contact application 596 at a commerce intermediary server, the commerce contact application 596 associated with the commerce representation for the commerce entity within the messaging system 140. The user information request for the scoped identifier 510 for the user account.

The consumer-to-business service 110 may determine a user access consent setting for the scoped identifier 510 for the user account. The user access consent setting may control whether private information for a user is distributed to a commerce entity. The consumer-to-business service 110 may send a user information data package 545 to the commerce contact application 596 from the commerce intermediary server in response to the user information request 540 when the user access consent setting for the scoped identifier 510 indicates user consent. The consumer-to-business service 110 may reject the user information request 540 when the user access consent setting for the scoped identifier 510 indicates user non-consent. Rejecting the user information request 540 may comprise sending a rejection message to the commerce contact application 596. A user information data package 545 may comprise one or more of name information for the user account, contact information for the user account, and biographical information for the user account.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6A illustrates one embodiment of a first logic flow 600. The logic flow 600 may be representative of some or all of the operations executed by one or more embodiments described herein.

In the illustrated embodiment shown in FIG. 6A, the logic flow 600 may send a page-scoped identifier to a commerce front-end application from a commerce intermediary server, the commerce front-end application associated with a commerce entity, the page-scoped identifier identifying a user account with a messaging system in relation to a commerce representation for the commerce entity within the messaging system at block 602.

The logic flow 600 may receive a user information request from a commerce contact application at the commerce intermediary server, the commerce contact application associated with the commerce representation for the commerce entity within the messaging system, the user information request for the page-scoped identifier at block 604.

The logic flow 600 may determine a user access consent setting for the page-scoped identifier for the user account at block 606.

The logic flow 600 may send a user information data package to the commerce contact application from the commerce intermediary server in response to the user information request when the user access consent setting for the page-scoped identifier indicates user consent at block 608.

The logic flow 600 may reject the user information request when the user access consent setting for the page-scoped identifier indicates user non-consent at block 610.

FIG. 6B illustrates one embodiment of a second logic flow 620. The logic flow 620 may be representative of some or all of the operations executed by one or more embodiments described herein.

In the illustrated embodiment shown in FIG. 6B, the logic flow 620 may receive a commerce message package at a commerce intermediary server from a commerce messaging application, the commerce messaging application associated with a commerce entity, the commerce message package addressed to a message thread with a messaging system at block 622.

The logic flow 620 may determine commerce access privileges for the commerce messaging application in association with the message thread at block 624.

The logic flow 620 may send the commerce message package to a client device associated with the message thread when the commerce access privileges indicate access to the message thread at block 626.

The logic flow 620 may reject the commerce message package when the commerce access privileges reject access to the message thread at block 628.

FIG. 6C illustrates one embodiment of a third logic flow 640. The logic flow 640 may be representative of some or all of the operations executed by one or more embodiments described herein.

In the illustrated embodiment shown in FIG. 6C, the logic flow 640 may receive a user interface selection of a user-to-commerce message thread on a client device, the user-to-commerce message thread associated with a commerce entity with a messaging system at block 642.

The logic flow 640 may display a user-to-commerce message thread interface for the user-to-commerce message thread at block 644.

The logic flow 640 may receive a user-to-commerce message via the user-to-commerce message thread interface for the user-to-commerce message thread at block 646.

The logic flow 640 may send the user-to-commerce message to the commerce entity via the messaging system at block 648.

FIG. 6D illustrates one embodiment of a fourth logic flow 660. The logic flow 660 may be representative of some or all of the operations executed by one or more embodiments described herein.

In the illustrated embodiment shown in FIG. 6D, the logic flow 660 may receive a commerce interface control selection in a user-to-user message thread interface on a client device, the user-to-user message thread associated with a user-to-user message thread for a plurality of users with a messaging system at block 662.

The logic flow 660 may display a commerce interface in association with the user-to-user message thread interface, the commerce interface comprising a plurality of commerce configuration options at block 664.

The logic flow 660 may receive a commerce option share control selection in association with the commerce interface at block 666.

The logic flow 660 may share the plurality of commerce configuration options with the user-to-user message thread at block 668.

The embodiments are not limited to these examples.

Figure 7:
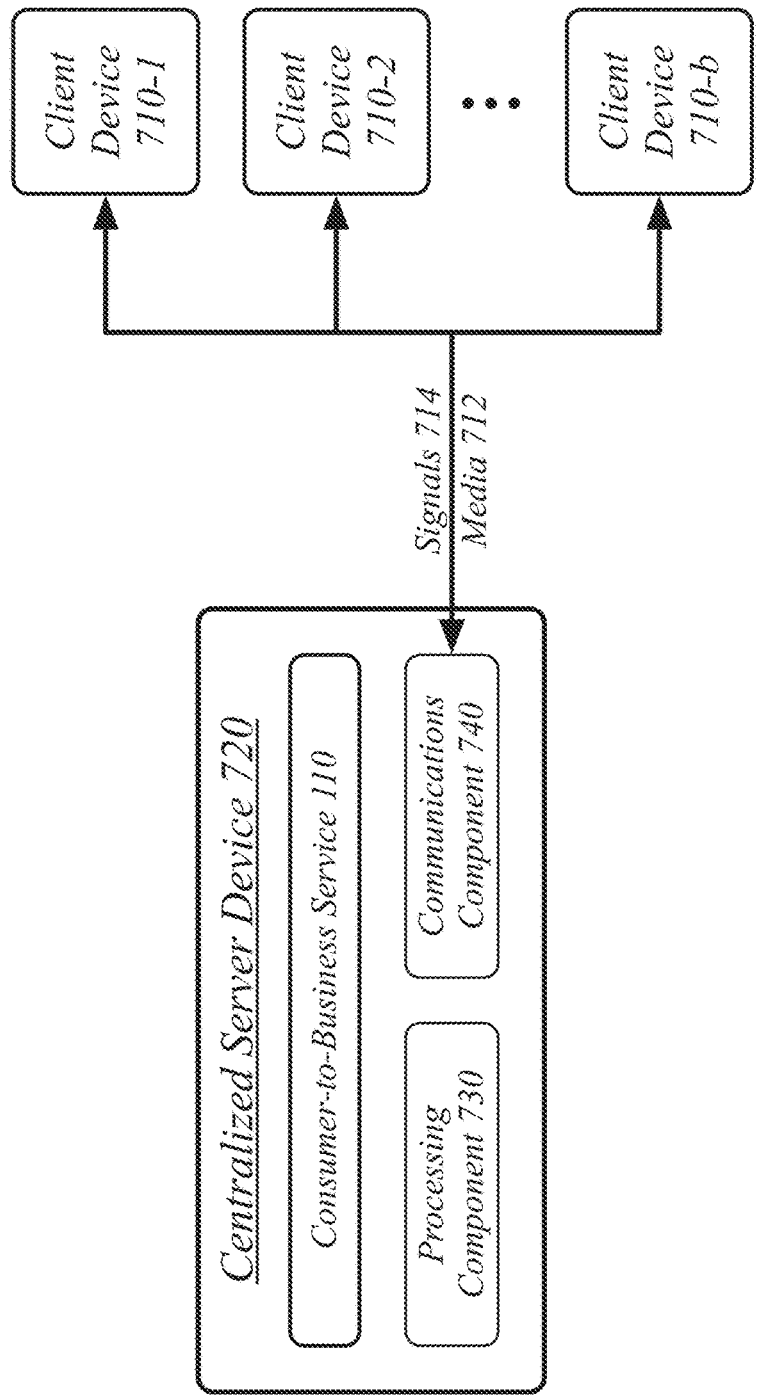
FIG. 7 illustrates an embodiment of a centralized system for the system of FIG. 1.

FIG. 7 illustrates a block diagram of a centralized system 700. The centralized system 700 may implement some or all of the structure and/or operations for the consumer-to-business messaging system 100 in a single computing entity, such as entirely within a single centralized server device 720.

The centralized server device 720 may comprise any electronic device capable of receiving, processing, and sending information for the consumer-to-business messaging system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the consumer-to-business messaging system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the consumer-to-business messaging system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may implement the consumer-to-business service 110 in a single computing entity. The centralized server device 720 may communicate with other devices over a communications media 712 using communications signals 714 via the communications component 740. The devices may be internal or external to the centralized server device 720 as desired for a given implementation. The centralized server device 720 may communicate with a plurality of client devices 710, such as may comprise the client device 120 and the recipient client device 125.

Figure 8:
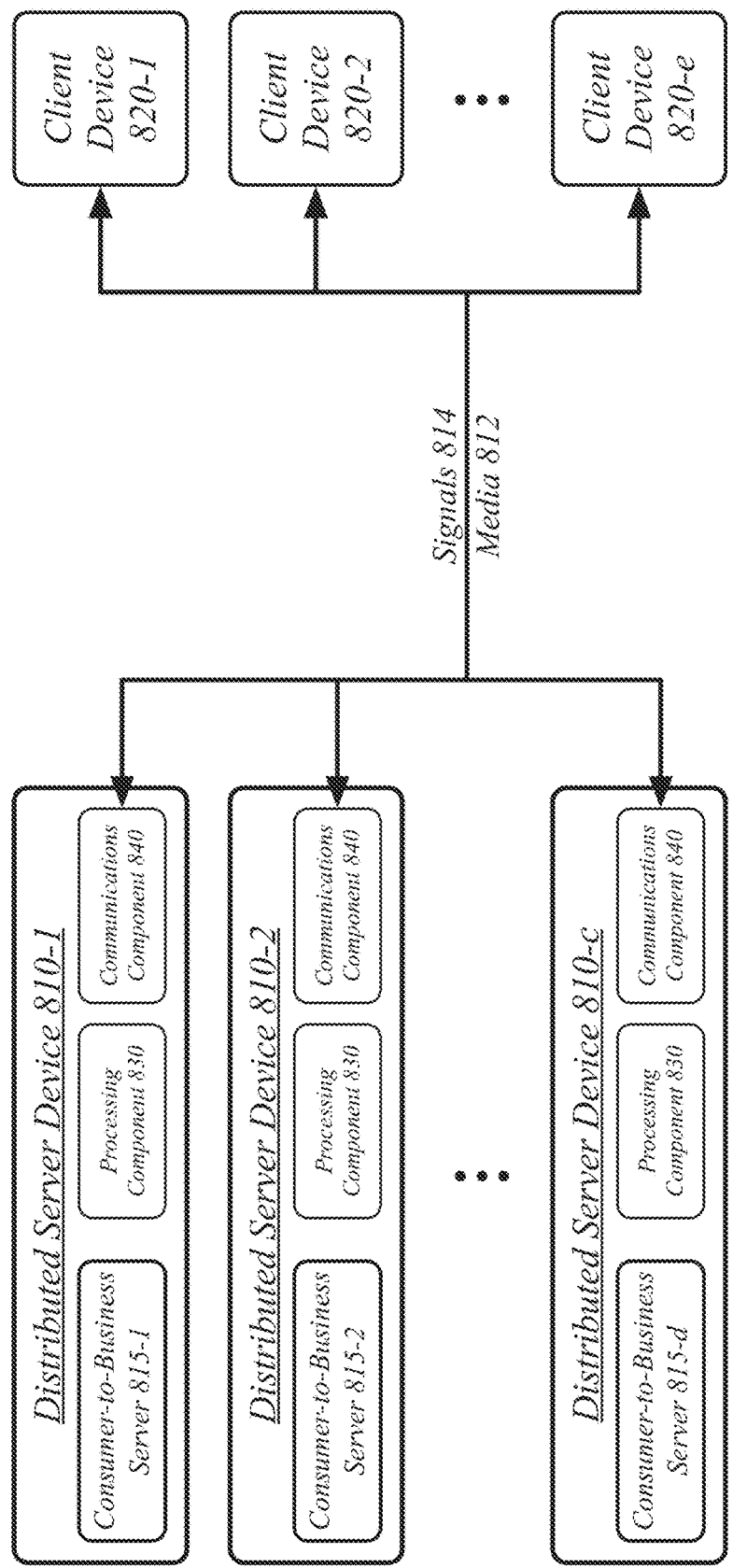
FIG. 8 illustrates an embodiment of a distributed system for the system of FIG. 1.

FIG. 8 illustrates a block diagram of a distributed system 800. The distributed system 800 may distribute portions of the structure and/or operations for the consumer-to-business messaging system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of distributed server devices 810. In general, the distributed server devices 810 may be the same or similar to the centralized server device 720 as described with reference to FIG. 7. For instance, the distributed server devices 810 may each comprise a processing component 830 and a communications component 840 which are the same or similar to the processing component 730 and the communications component 740, respectively, as described with reference to FIG. 7. In another example, the distributed server devices 810 may communicate over a communications media 812 using communications signals 814 via the communications components 840.

The distributed server devices 810 may comprise or employ one or more server programs that operate to perform various methodologies in accordance with the described embodiments. In one embodiment, for example, the distributed server devices 810 may each implement one or more consumer-to-business servers 815. The consumer-to-business servers 815 may collectively implement the consumer-to-business service 110 as a distributed computing entity. The consumer-to-business servers 815 may communicate with a plurality of client devices 820, such as may comprise the client device 120, the recipient client device 125, and client devices 710.

Figure 9:
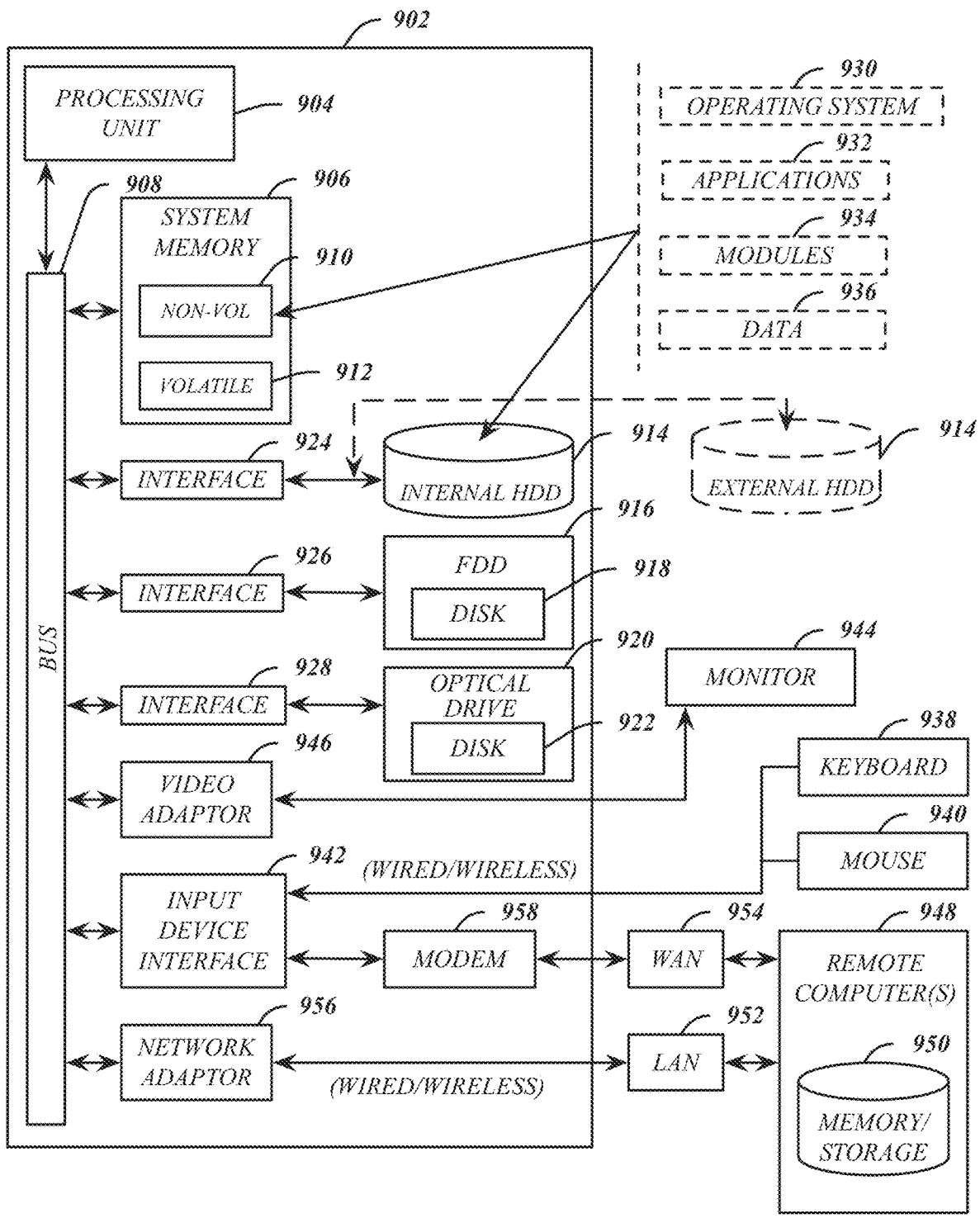
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 7, 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the consumer-to-business messaging system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
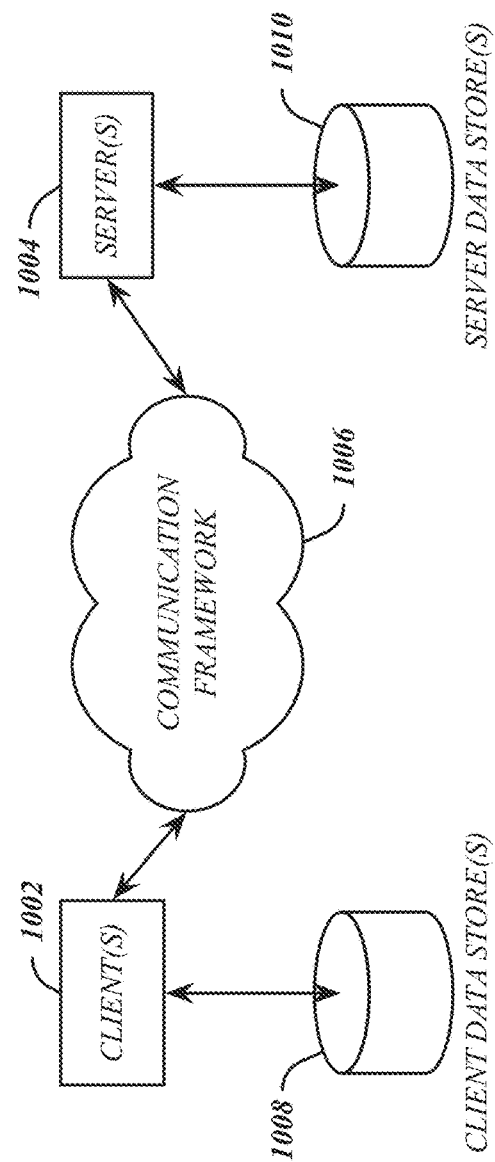
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement client devices, such as may include the client device 120, the recipient client device 125, the client devices 710, and the client devices 820. The servers 1004 may implement the consumer-to-business service 110 as a centralized or distributed entity. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
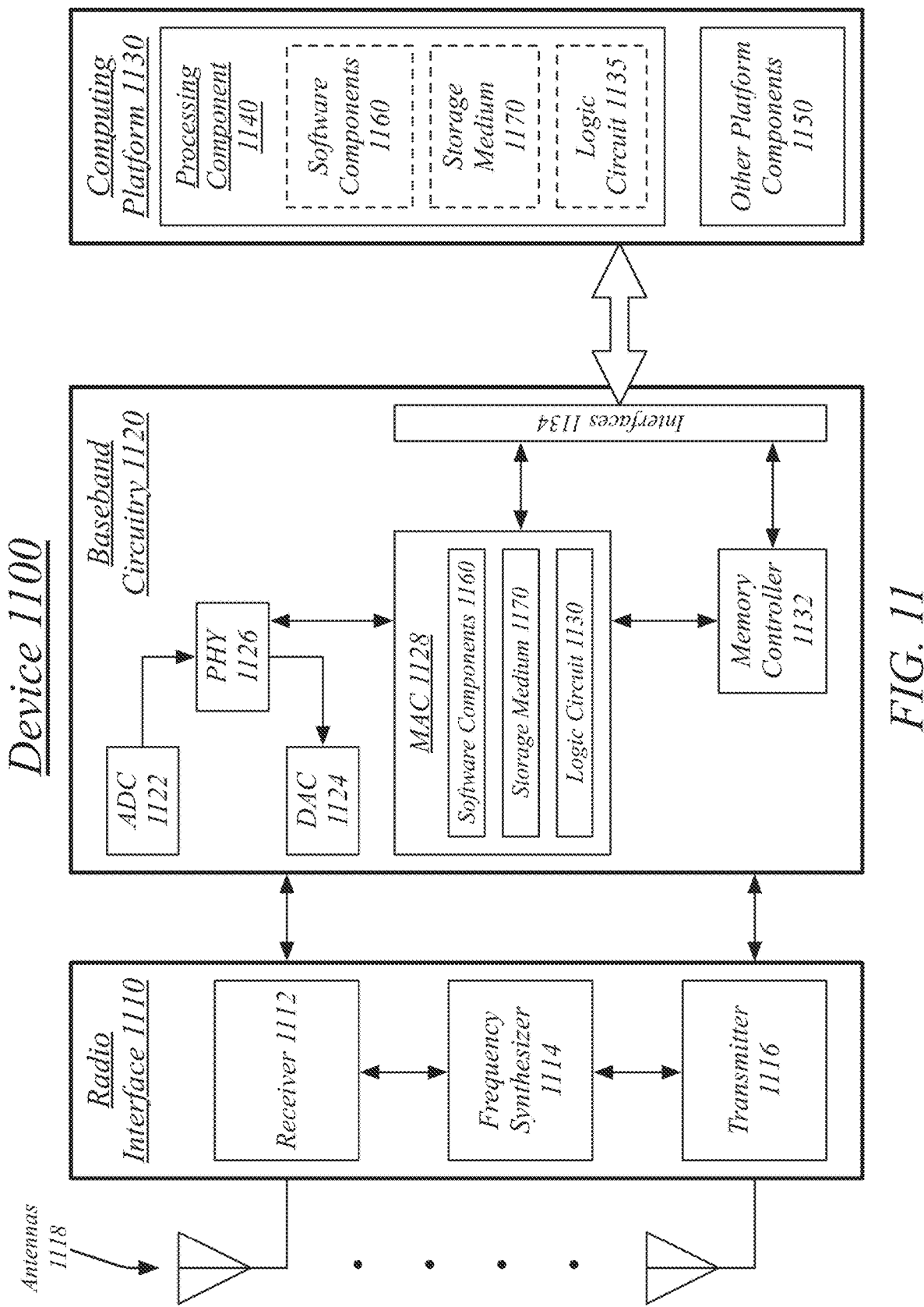
FIG. 11 illustrates an embodiment of a radio device architecture.

FIG. 11 illustrates an embodiment of a device 1100 for use in a multicarrier OFDM system, such as the consumer-to-business messaging system 100. Device 1100 may implement, for example, software components 1160 as described with reference to system 100 and/or a logic circuit 1135. The logic circuit 1135 may include physical circuits to perform operations described for the consumer-to-business messaging system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the consumer-to-business messaging system 100 and/or logic circuit 1135 in a single computing entity, such as entirely within a single device. Alternatively, the device 1100 may distribute portions of the structure and/or operations for the consumer-to-business messaging system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the consumer-to-business messaging system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise sending a page-scoped identifier to a commerce front-end application from a commerce intermediary server, the commerce front-end application associated with a commerce entity, the page-scoped identifier identifying a user account with a messaging system in relation to a commerce representation for the commerce entity within the messaging system; receiving a user information request from a commerce contact application at the commerce intermediary server, the commerce contact application associated with the commerce representation for the commerce entity within the messaging system, the user information request for the page-scoped identifier; determining a user access consent setting for the page-scoped identifier for the user account; sending a user information data package to the commerce contact application from the commerce intermediary server in response to the user information request when the user access consent setting for the page-scoped identifier indicates user consent; and rejecting the user information request when the user access consent setting for the page-scoped identifier indicates user non-consent.

A computer-implemented method may further comprise wherein the commerce front-end application and the commerce contact application comprise distinct applications.

A computer-implemented method may further comprise wherein the commerce front-end application and the commerce contact application are a common application.

A computer-implemented method may further comprise the commerce entity corresponding to a commerce type, the commerce intermediary server supporting a plurality of commerce types, the commerce type comprising one of the plurality of commerce types.

A computer-implemented method may further comprise the user information data package comprising one or more of name information for the user account, contact information for the user account, and biographical information for the user account.

A computer-implemented method may further comprise receiving a user-to-commerce invocation associated with the commerce entity in association with the user account; generating the page-scoped identifier in response to the user-to-commerce invocation; and sending the page-scoped identifier to the commerce front-end application in response to the user-to-commerce invocation.

A computer-implemented method may further comprise receiving a user-to-commerce message thread invocation from a client device associated with the user account, the user-to-commerce message thread invocation in association with a commerce-entity discovery interface on the client device; and sending the page-scoped identifier to the commerce front-end application in response to receiving the user-to-commerce message thread invocation from the client device.

A computer-implemented method may further comprise receiving a user-to-commerce message thread invocation from a client device associated with the user account, the user-to-commerce message thread invocation in association with a commerce-entity trigger suggestion on the client device; and sending the page-scoped identifier to the commerce front-end application in response to receiving the user-to-commerce message thread invocation from the client device.

A computer-implemented method may further comprise receiving a user-to-commerce invocation in association with a web plugin on a web page associated with the commerce entity; and sending the page-scoped identifier to the commerce front-end application in response to receiving the user-to-commerce invocation in association with the web plugin.

A computer-implemented method may further comprise receiving a phone number record from the commerce front-end application; matching the phone number record to the user account; and sending the page-scoped identifier to the commerce front-end application in response to matching the phone number record received from the commerce front-end application to the user account.

A computer-implemented method may further comprise receiving a user-to-commerce invocation from a client device associated with the user account, the user-to-commerce invocation in association with a visual code capture by the client device, the visual code capture identifying the commerce entity; and sending the page-scoped identifier to the commerce front-end application in response to receiving the user-to-commerce invocation from a client device.

A computer-implemented method may further comprise receiving a user account access associated with the user account to the commerce representation for the commerce entity within the messaging system; and sending the page-scoped identifier to the commerce front-end application in response to receiving the user account access.

A computer-implemented method may further comprise receiving a commerce-to-user message from a commerce messaging application, the commerce-to-user message addressed to the page-scoped identifier; identifying the user account based on the page-scoped identifier; and sending the commerce-to-user message to a client device associated with the user account.

A computer-implemented method may further comprise receiving a user-to-commerce message from a client device associated with the user account, the user-to-commerce message addressed to a user-to-commerce message thread associated with the commerce entity; and setting the user access consent setting for the page-scoped identifier for the user account to indicate user consent.

A computer-implemented method may further comprise the user-to-commerce message comprising a response to a commerce-to-user message sent to the client device by a commerce messaging application associated with the commerce entity.

An apparatus may comprise a processor circuit on a device; and a commerce intermediary server operative on the processor circuit to send a page-scoped identifier to a commerce front-end application, the commerce front-end application associated with a commerce entity, the page-scoped identifier identifying a user account with a messaging system in relation to a commerce representation for the commerce entity within the messaging system; receive a user information request from a commerce contact application at the commerce intermediary server, the commerce contact application associated with the commerce representation for the commerce entity within the messaging system, the user information request for the page-scoped identifier; determine a user access consent setting for the page-scoped identifier for the user account; send a user information data package to the commerce contact application in response to the user information request when the user access consent setting for the page-scoped identifier indicates user consent; and reject the user information request when the user access consent setting for the page-scoped identifier indicates user non-consent. The apparatus may be operative to implement any of the computer-implemented methods described herein.

A computer-implemented method may comprise receiving a commerce message package at a commerce intermediary server from a commerce messaging application, the commerce messaging application associated with a commerce entity, the commerce message package addressed to a message thread with a messaging system; determining commerce access privileges for the commerce messaging application in association with the message thread; sending the commerce message package to a client device associated with the message thread when the commerce access privileges indicate access to the message thread; and rejecting the commerce message package when the commerce access privileges reject access to the message thread.

A computer-implemented method may further comprise the message thread associated with a user account for a user of the messaging system, the user identifier comprising a page-scoped identifier for the user account, the page-scoped identifier identifying the user account with the messaging system in relation to a commerce representation for the commerce entity within the messaging system.

A computer-implemented method may further comprise the commerce access privileges determined according to a limited-time access token received in association with the commerce message package.

A computer-implemented method may further comprise the commerce access privilege determined according to a sponsored messaging request associated with the commerce message package.

A computer-implemented method may further comprise the commerce access privilege determined according to a message throttling policy.

A computer-implemented method may further comprise selecting the commerce access privilege for automatic sampling based on an automatic sampling policy.

A computer-implemented method may further comprise performing a keyword-based spam analysis of the commerce message package.

A computer-implemented method may further comprise receiving a user block command in association with the message thread; and registering a negative reputation adjustment in association with the commerce entity.

A computer-implemented method may further comprise the commerce message package specified according to a custom message template associated with the commerce entity.

A computer-implemented method may further comprise receiving an application registration package in association with the commerce messaging application; and registering the commerce messaging application for access to the commerce intermediary server in response to the application registration package.

A computer-implemented method may further comprise the application registration package defining one or more of a custom message template, a custom form template, and a custom call-to-action button.

A computer-implemented method may further comprise sending one or more of the custom message template, the custom form template, and the custom call-to-action button to the client device in response to the client device accessing the commerce entity within the messaging system.

A computer-implemented method may further comprise the application registration package defining a custom call-to-action button, the custom call-to-action button comprising visual representation information and activation response information, the activation response information comprising one or more of a uniform resource locator, an application link, and a messaging invocation.

A computer-implemented method may further comprise the application registration package defining one or more of a custom welcome text message for the message thread, a custom get-started call-to-action button for the message thread, one or more custom pestilent call-to-action buttons for the message thread, and one or more custom dynamic triggers to start an interaction.

An apparatus may comprise a processor circuit on a device; and a commerce intermediary server operative on the processor circuit to receive a commerce message package from a commerce messaging application, the commerce messaging application associated with a commerce entity, the commerce message package addressed to a message thread with a messaging system; determine commerce access privileges for the commerce messaging application in association with the message thread; send the commerce message package to a client device associated with the message thread when the commerce access privileges indicate access to the message thread; and reject the commerce message package when the commerce access privileges reject access to the message thread. The apparatus may be operative to implement any of the computer-implemented methods described herein.

A computer-implemented method may comprise receiving a user interface selection of a user-to-commerce message thread on a client device, the user-to-commerce message thread associated with a commerce entity with a messaging system; displaying a user-to-commerce message thread interface for the user-to-commerce message thread; receiving a user-to-commerce message via the user-to-commerce message thread interface for the user-to-commerce message thread; and sending the user-to-commerce message to the commerce entity via the messaging system.

A computer-implemented method may further comprise receiving a commerce-to-user message from the commerce entity via the messaging system; and displaying the commerce-to-user message in association with the user-to-commerce message thread on the client device.

A computer-implemented method may further comprise the commerce-to-user message defined according to a custom message template associated with the commerce entity.

A computer-implemented method may further comprise the commerce-to-user message received from a commerce messaging application registered with the messaging system, the commerce messaging application associated with the commerce entity, the custom message template registered for the commerce messaging application with the messaging system.

A computer-implemented method may further comprise the user-to-commerce message thread interface comprising a custom call-to-action button for the commerce entity, further comprising: receiving a user call-to-action button activation of the custom call-to-action button; and generating the user-to-commerce message in response to receiving the user call-to-action button activation of the custom call-to-action button.

A computer-implemented method may further comprise the user-to-commerce message thread interface comprising one or more of a custom welcome text message for the message thread, a custom get-started call-to-action button for the message thread, one or more custom pestilent call-to-action buttons for the message thread, and one or more custom triggers to start an interaction.

A computer-implemented method may further comprise the user-to-commerce message thread associated with a user account, further comprising: displaying a user-to-commerce discovery interface on the client device, the user-to-commerce discovery interface comprising a plurality of suggested user-to-commerce options, the plurality of suggested user-to-commerce options selected according to one or more of profile information for the user account and promotional consideration information for one or more commerce entities.

A computer-implemented method may further comprise sending user credentials to the commerce entity in association with the user-to-commerce message.

A computer-implemented method may further comprise the commerce entity associated with a local application on the client device, further comprising: retrieving the user credentials from the local application via deep-linking within the local application.

An apparatus may comprise a processor circuit on a device; and a commerce intermediary server operative on the processor circuit to receive a user interface selection of a user-to-commerce message thread on a client device, the user-to-commerce message thread associated with a commerce entity with a messaging system; display a user-to-commerce message thread interface for the user-to-commerce message thread; receive a user-to-commerce message via the user-to-commerce message thread interface for the user-to-commerce message thread; and send the user-to-commerce message to the commerce entity via the messaging system. The apparatus may be operative to implement any of the computer-implemented methods described herein.

A computer-implemented method may comprise receiving a commerce interface control selection in a user-to-user message thread interface on a client device, the user-to-user message thread associated with a user-to-user message thread for a plurality of users with a messaging system; displaying a commerce interface in association with the user-to-user message thread interface, the commerce interface comprising a plurality of commerce configuration options; receiving a commerce option share control selection in association with the commerce interface; and sharing the plurality of commerce configuration options with the user-to-user message thread.

A computer-implemented method may further comprise wherein sharing the plurality of commerce configuration options with the user-to-user message thread comprises posting the plurality of commerce configuration options to the user-to-user message thread as a user-to-user message.

A computer-implemented method may further comprise wherein sharing the plurality of commerce configuration options with the user-to-user message thread comprises submitting a commerce configuration option poll to the user-to-user message thread.

A computer-implemented method may further comprise receiving poll result information for the commerce configuration option poll; and displaying the poll result information for the commerce configuration option poll.

A computer-implemented method may further comprise the poll result information for the commerce configuration option poll displayed in association with the plurality of commerce configuration options in the commerce interface.

A computer-implemented method may further comprise the poll result information comprising a poll winner option corresponding to one of the plurality of commerce configuration options, further comprising: displaying a poll winner indicator in association with the poll winner option in the display of the plurality of commerce configuration options in the commerce interface.

A computer-implemented method may further comprise the commerce interface associated with a commerce entity, the plurality of commerce configuration options selected for the commerce interface according to one or more of message-thread context for the user-to-user message thread and a promotional consideration transaction with the commerce entity.

A computer-implemented method may further comprise the commerce interface associated with a commerce entity, the plurality of commerce configuration options ranked in the commerce interface according to one or more of message-thread context for the user-to-user message thread and a promotional consideration transaction with the commerce entity.

A computer-implemented method may further comprise the commerce interface associated with a commerce entity, the commerce interface control selection for a commerce interface control, further comprising: displaying the commerce interface control in response to one or more of message-thread context for the user-to-user message thread and a promotional consideration transaction with the commerce entity.

A computer-implemented method may further comprise wherein displaying the commerce interface control is in response to one or more of a trigger detected in the user-to-user message thread and a discovery control selection.

A computer-implemented method may further comprise the commerce interface associated with a commerce entity, further comprising: receiving a commerce option selection via the commerce interface; and sending a commerce configuration command from the client device to the commerce entity via the messaging system.

A computer-implemented method may further comprise receiving a user-to-user message-thread message from the commerce entity via the messaging system; storing the user-to-user message-thread message in association with the user-to-user message thread; and displaying the user-to-user message-thread message in the user-to-user message thread interface.

A computer-implemented method may further comprise receiving a user-to-commerce message-thread message from the commerce entity via the messaging system; and storing the user-to-commerce message-thread message in association with a user-to-commerce message thread.

A computer-implemented method may further comprise displaying the user-to-commerce message-thread message in a user-to-commerce message thread interface.

An apparatus may comprise a processor circuit on a device; and a commerce intermediary server operative on the processor circuit to receive a commerce interface control selection in a user-to-user message thread interface on a client device, the user-to-user message thread associated with a user-to-user message thread for a plurality of users with a messaging system; display a commerce interface in association with the user-to-user message thread interface, the commerce interface comprising a plurality of commerce configuration options; receive a commerce option share control selection in association with the commerce interface; and share the plurality of commerce configuration options with the user-to-user message thread. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/ or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
receiving, at a messaging system, a sponsored message from a commerce entity for delivery to a target user of the messaging system;
determining if the target user has expressed an implied consent to receive the sponsored message;
forwarding the sponsored message to the target user when the implied consent of the target user to receive the sponsored message has been expressed; and
rejecting the sponsored message when the implied consent of the target user to receive the sponsored message has not been expressed;
wherein the implied consent is expressed when the target user has engaged in a messaging interaction with the commerce entity; and
wherein the messaging interaction is an email interaction, an SMS interaction or a chat interaction.

2. The method of claim 1, wherein the sponsored message is forwarded to the target user only if an analysis of the sponsored message indicates that the sponsored message is responsive to a previous messaging interaction between the target user and the commerce entity.

3. The method of claim 1, wherein the implied consent is time-limited.

4. The method of claim 1, wherein the forwarded sponsored messages include one or more user controls, at least one of which, when selected by the target user, indicates a withdrawal of the implied consent to receive sponsored messages from the commerce entity, further comprising:
receiving an indication of a user selection of the user control to withdraw implied consent; and
rejecting further sponsored messages from the commerce entity for delivery to the target user.

5. The method of claim 4 further comprising:
tracking a number of users of the messaging system that have withdrawn their implied consent to receive sponsored messages from the commerce entity;
determining that the number of users that have withdrawn their implied consent has reached a predetermined threshold; and
penalizing the commerce entity by blocking the commerce entity from sending sponsored messages, rate limiting the commerce entity or removing the commerce entity from the messaging system.

6. The method of claim 4, wherein the one or more user controls include:
a full-block control which, when selected, indicates a withdrawal of the implied consent of the target user to receive further sponsored messages from the commerce entity; and
a sponsored message block control which, when selected, indicates a withdrawal of the implied consent of the target user to receive sponsored messages unrelated to previous messaging interactions between the target user and the commerce entity.

7. A system comprising:
a processor;
memory, coupled to the processor; and
a non-transitory, computer-readable storage media containing software that, when loaded into the memory and executed by the processor, cause the system to:
receive, at a messaging system, a sponsored message from a commerce entity for delivery to a target user of the messaging system;
determine if the target user has expressed an implied consent to receive the sponsored message;
forward the sponsored message to the target user when the implied consent of the target user to receive the sponsored message has been expressed; and
reject the sponsored message when the implied consent of the target user to receive the sponsored message has not been expressed;
wherein the implied consent is expressed when the target user has engaged in a messaging interaction with the commerce entity; and
wherein the messaging interaction is an email interaction, an SMS interaction or a chat interaction.

8. The system of claim 7, wherein the sponsored message is forwarded to the target user only if an analysis of the sponsored message indicates that the sponsored message is responsive to a previous messaging interaction between the target user and the commerce entity.

9. The system of claim 7, wherein the implied consent is time-limited.

10. The system of claim 7, wherein the forwarded sponsored messages include one or more user controls, at least one of which, when selected by the target user, indicates a withdrawal of the implied consent to receive sponsored messages from the commerce entity, the software further causing the system to:
receive an indication of a user selection of the user control to withdraw implied consent; and
reject further sponsored messages from the commerce entity for delivery to the target user.

11. The system of claim 7, the software further causing the system to:
track a number of users of the messaging system that have withdrawn their implied consent to receive sponsored messages from the commerce entity;
determine that the number of users that have withdrawn their implied consent has reached a predetermined threshold; and
penalize the commerce entity by blocking the commerce entity from sending sponsored messages, rate limiting the commerce entity or removing the commerce entity from the messaging system.

12. The system of claim 10, wherein the one or more user controls includes:
a full-block control which, when selected, indicates a withdrawal of the implied consent of the target user to receive further sponsored messages from the commerce entity; and
a sponsored message block control which, when selected, indicates a withdrawal of the implied consent of the target user to receive sponsored messages unrelated to previous messaging interactions between the target user and the commerce entity.

13. A non-transitory, computer-readable media containing software that, when executed by a processor, cause the processor to:
receive, at a messaging system, a sponsored message from a commerce entity for delivery to a target user of the messaging system;
determine if the target user has expressed an implied consent to receive the sponsored message;
forward the sponsored message to the target user when the implied consent of the target user to receive the sponsored message has been expressed; and reject the sponsored message when the implied consent of the target user to receive the sponsored message has not been expressed;

wherein the implied consent is expressed when the target user has engaged in a messaging interaction with the commerce entity; and wherein the messaging interaction is an email interaction, an SMS interaction or a chat interaction.

14. The media of claim 13, wherein the sponsored message is forwarded to the target user only if an analysis of the sponsored message indicates that the sponsored message is responsive to a previous messaging interaction between the target user and the commerce entity.

15. The media of claim 13, wherein the forwarded messages include one or more user controls, at least one of which, when selected by the target user, indicates a withdrawal of the implied consent to receive sponsored messages from the commerce entity, the software further causing the processor to:

receive an indication of a user selection of the user control to withdraw implied consent; and reject further sponsored messages from the commerce entity for delivery to the target user.

16. The media of claim 13, the software further causing the processor to:

track a number of users of the messaging system that have withdrawn their implied consent to receive sponsored messages from the commerce entity;

determine that the number of users that have withdrawn their implied consent has reached a predetermined threshold; and penalize the commerce entity by blocking the commerce entity from sending sponsored messages, rate limiting the commerce entity or removing the commerce entity from the messaging system.

17. The media of claim 15, the one or more user controls including:

a full-block control which, when selected, indicates a withdrawal of the implied consent of the target user to receive further sponsored messages from the commerce entity; and a sponsored message block control which, when selected, indicates a withdrawal of the implied consent of the target user to receive sponsored messages unrelated to previous messaging interactions between the target user and the commerce entity.

* * * * *